United States Patent
Anttila

(10) Patent No.: US 11,536,697 B2
(45) Date of Patent: Dec. 27, 2022

(54) ACOUSTIC EVALUATION OF WOOD PROPERTIES

(71) Applicant: USNR, LLC, Woodland, WA (US)

(72) Inventor: Aki J. Anttila, Portland, OR (US)

(73) Assignee: USNR, LLC, Woodland, WA (US)

( * ) Notice: Subject to any disclaimer, the term of this patent is extended or adjusted under 35 U.S.C. 154(b) by 55 days.

(21) Appl. No.: 17/190,368

(22) Filed: Mar. 2, 2021

(65) Prior Publication Data

US 2021/0247363 A1 Aug. 12, 2021

Related U.S. Application Data

(60) Provisional application No. 62/984,287, filed on Mar. 2, 2020.

(51) Int. Cl.
*G01N 29/28* (2006.01)
*G01N 29/07* (2006.01)

(52) U.S. Cl.
CPC ............. *G01N 29/07* (2013.01); *G01N 29/28* (2013.01); *G01N 2291/011* (2013.01); *G01N 2291/0238* (2013.01); *G01N 2291/02827* (2013.01); *G01N 2291/101* (2013.01)

(58) Field of Classification Search
CPC ........ G01N 29/07; G01N 29/28; G01N 29/27; G01N 29/045; G01N 29/011; G01N 29/0238; G01N 2291/101; G01N 29/02827; G01N 2291/0258
USPC .......................................................... 73/597
See application file for complete search history.

(56) References Cited

U.S. PATENT DOCUMENTS

| 6,026,689 A | 2/2000 | Snyder | |
| 6,347,542 B1 * | 2/2002 | Larsson | G01N 3/307 |
| | | | 73/12.09 |
| 6,813,927 B1 * | 11/2004 | Harris | G01N 33/46 |
| | | | 73/12.09 |

(Continued)

FOREIGN PATENT DOCUMENTS

| CA | 2569217 | * | 6/2007 | ......... G01N 29/4418 |
| EP | 1840565 A1 | * | 10/2007 | ............. G01N 29/07 |

(Continued)

OTHER PUBLICATIONS

PCT Application No. PCT/US2021/020546; International Search Report and Written Opinion, dated Jun. 18, 2021.

*Primary Examiner* — Jacques M Saint Surin
(74) *Attorney, Agent, or Firm* — Schwabe, Williamson & Wyatt, P.C.

(57) ABSTRACT

Embodiments provide systems, apparatuses, and method for determining the Modulus of Elasticity (MOE) of a wood workpiece based on the travel time and/or velocity of an impact-induced acoustic stress wave. A housing may be configured to reduce extraneous acoustic waves and/or contaminants near an acoustic transducer to thereby reduce errors in the detection/identification of the acoustic stress wave. A computer system may be programmed to determine the MOE of the workpiece based on the travel time and/or velocity of multiple acoustic stress waves induced by corresponding impacts at respective locations along the end of the workpiece as the workpiece travels in a first direction. Corresponding methods and an induction system for rapidly and repeatedly striking the end of the workpiece are also described herein.

19 Claims, 15 Drawing Sheets

(56) References Cited

U.S. PATENT DOCUMENTS

| | | | |
|---|---|---|---|
| 6,889,551 B2 * | 5/2005 | Andrews | G01N 29/07 700/35 |
| 6,996,497 B2 * | 2/2006 | Floyd | G01N 33/0098 702/170 |
| 7,383,730 B2 * | 6/2008 | Huang | G01N 29/07 73/602 |
| 2003/0150277 A1 | 8/2003 | Andrews | |
| 2010/0064810 A1 | 3/2010 | Giudiceandrea | |

FOREIGN PATENT DOCUMENTS

| EP | 2363703 B1 | 5/2014 |
|---|---|---|
| WO | WO2009-014463 A1 | 1/2009 |

* cited by examiner

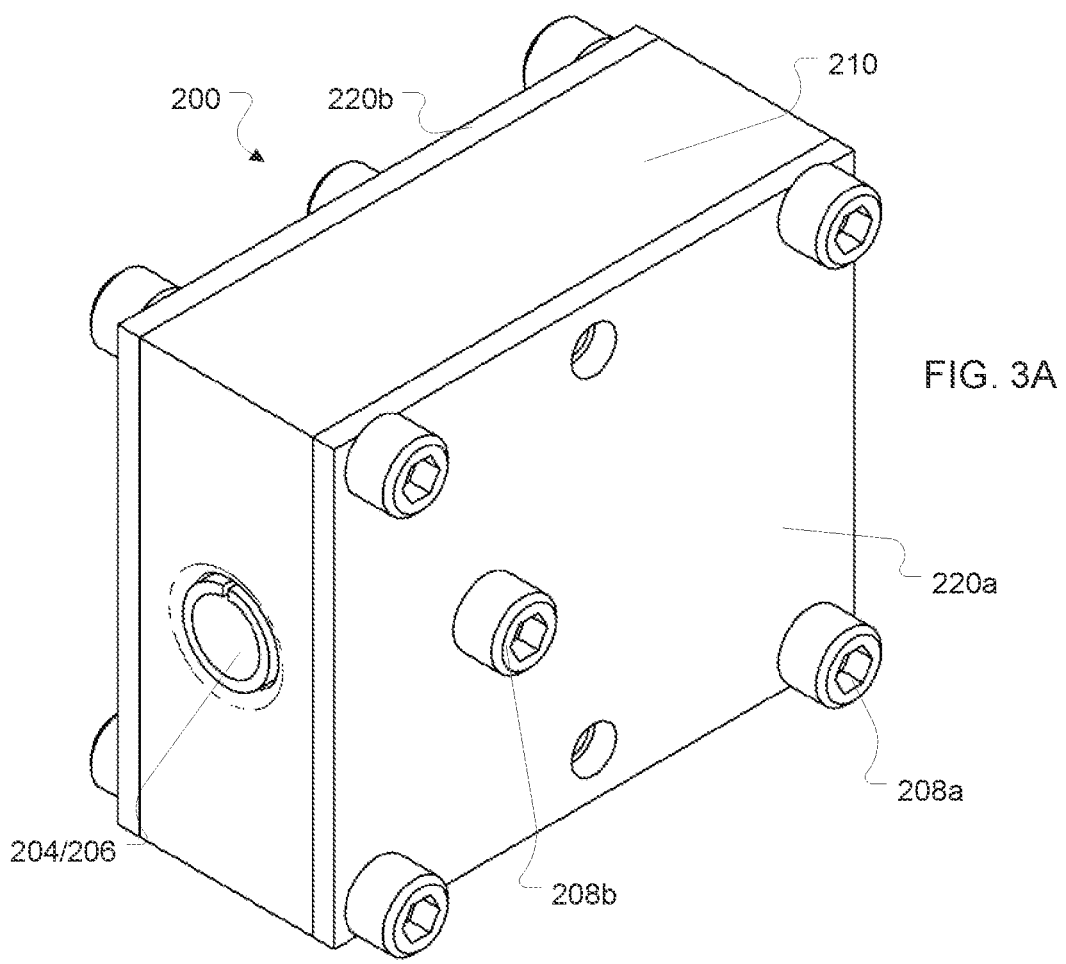
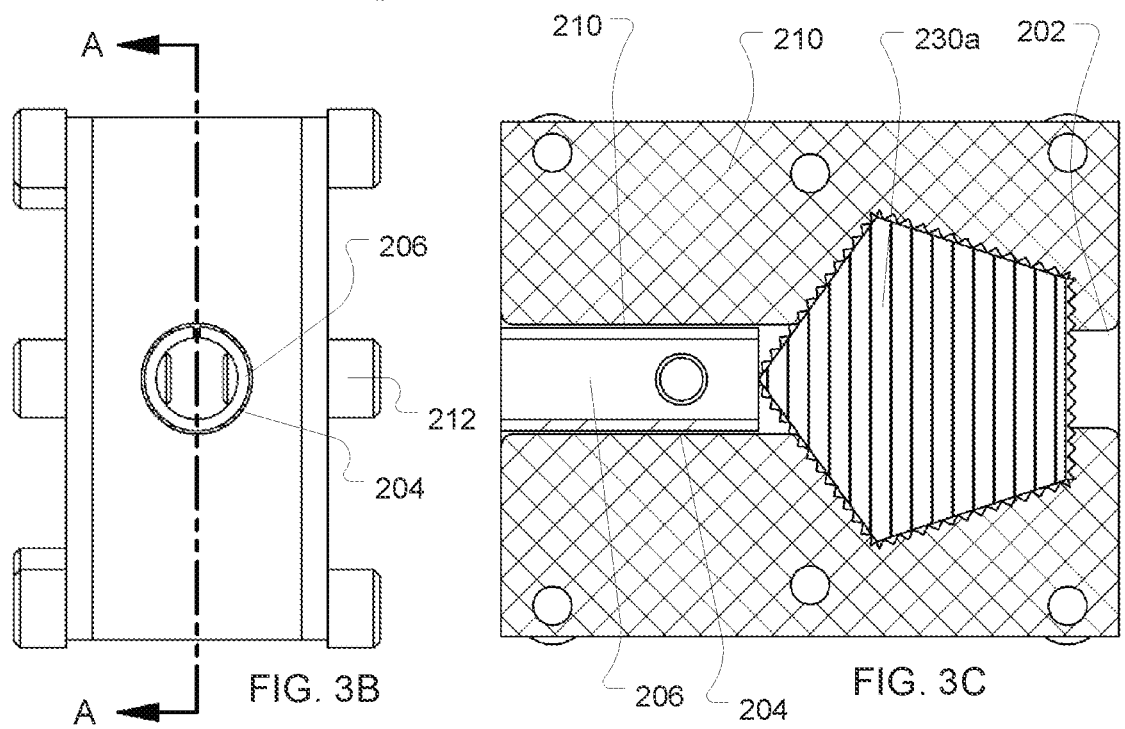

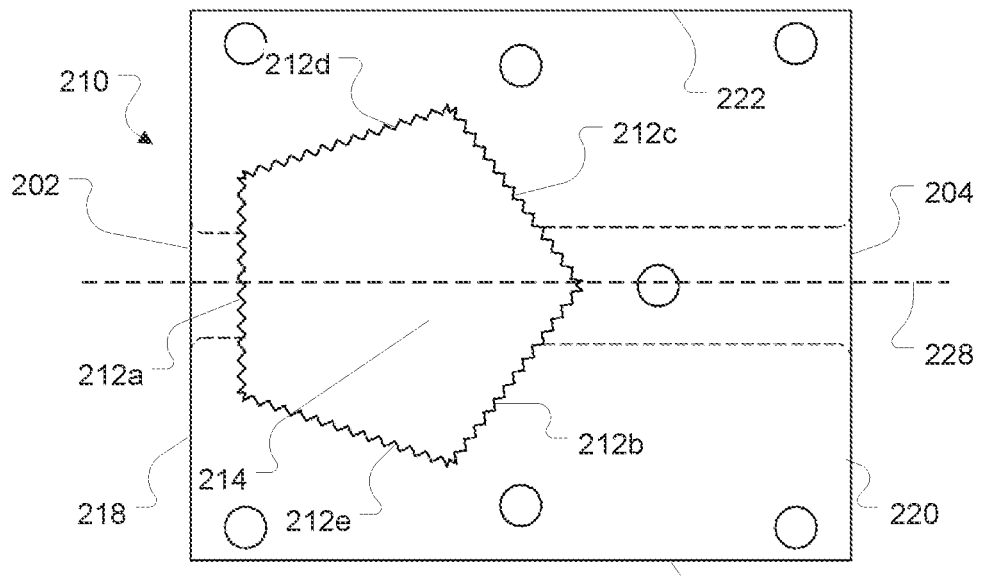
FIG. 3D
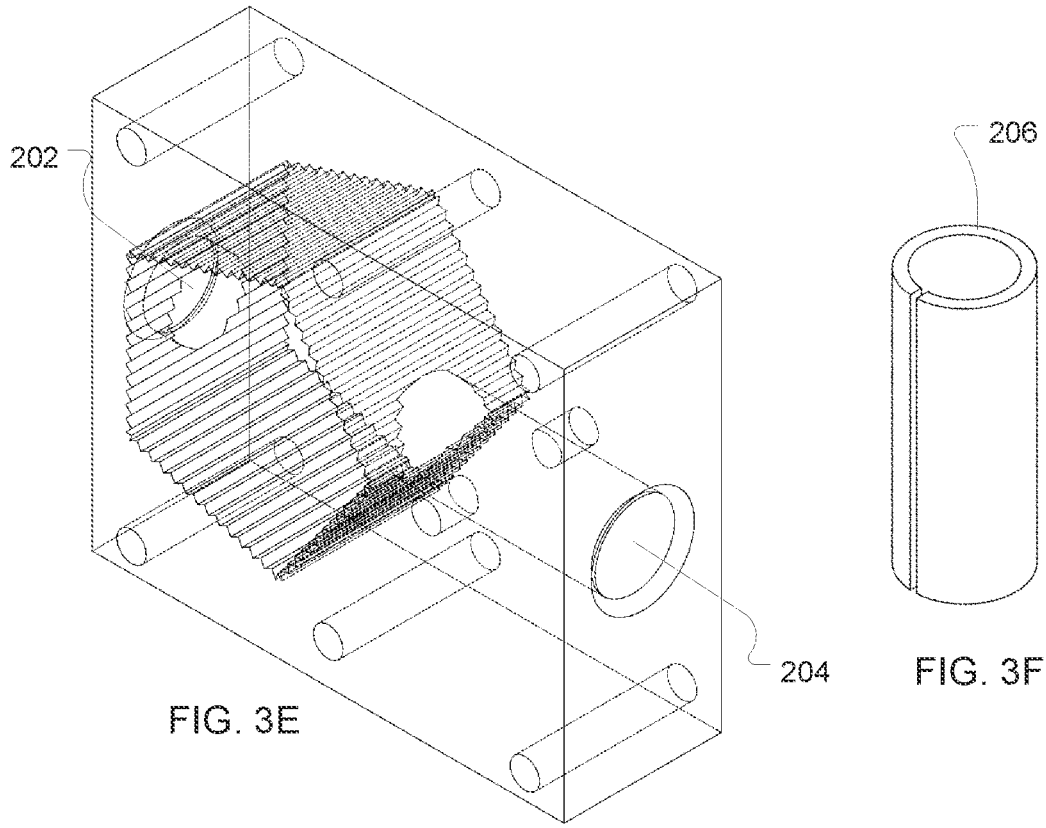
FIG. 3E
FIG. 3F

ACOUSTIC EVALUATION OF WOOD PROPERTIES

TECHNICAL FIELD

Embodiments herein relate to the field of lumber manufacturing, and, more specifically, to methods, systems, and apparatuses for estimating the strength and/or stiffness of elongated wood workpieces based in part on acoustic data.

BACKGROUND

Lumber—i.e., solid pieces of wood sawn from logs—is produced for a variety of uses. The suitability of a given piece of lumber for a particular use is partly a function of inherent characteristics such as wood type (e.g., hardwood vs. softwood), wood species, and natural defects (e.g., knots, rot, pitch pockets, compression wood, etc.), and characteristics introduced or influenced by the manufacturing process, such as the dimensions of the piece, moisture content, manufacturing defects, the locations of natural or manufacturing defects relative to the machined surfaces, and the like. Many of these characteristics affect the appearance, strength, stiffness, and other properties of lumber. As wood is a natural product, the properties of lumber can vary widely, even among pieces of lumber cut from the same log.

Lumber is commonly graded according to established rules. Different sets of rules are applicable to different lumber types and intended uses. For example, in the context of softwood lumber, appearance lumber intended for decorative or non-structural use is often graded based on visual appearance, while 'dimensional' lumber intended for structural use is often graded based on mechanical properties that relate to strength. Stiffness, which is commonly expressed as a modulus of elasticity (MOE), has a known relationship to bending strength and is frequently used to estimate strength.

Historically, strength grading was performed by human graders based on visual inspection of the lumber and a complex set of visual grading rules. More recently, lumber manufacturing facilities have begun to use mechanical strength grading systems to grade structural lumber automatically. One type of mechanical strength grading system is commonly known as an acoustic grader. This type of system typically includes an impact device, such as a spring-loaded hammer, and an acoustic detector such as a microphone. The hammer is actuated to strike one end of the piece of lumber, creating an acoustic stress wave that travels through the lumber along the longitudinal axis of the lumber. In principle, the microphone detects the acoustic wave at some location along the lumber piece—usually at one of the ends—and the system determines the MOE of the lumber based on the travel time or travel velocity of the wave. The strength of the piece is then estimated based on the determined MOE according to the known relationship.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 3A-F, 4A-C, and 5A-C illustrate components of a housing for an acoustic detector;

DETAILED DESCRIPTION OF DISCLOSED EMBODIMENTS

Figure 1A:
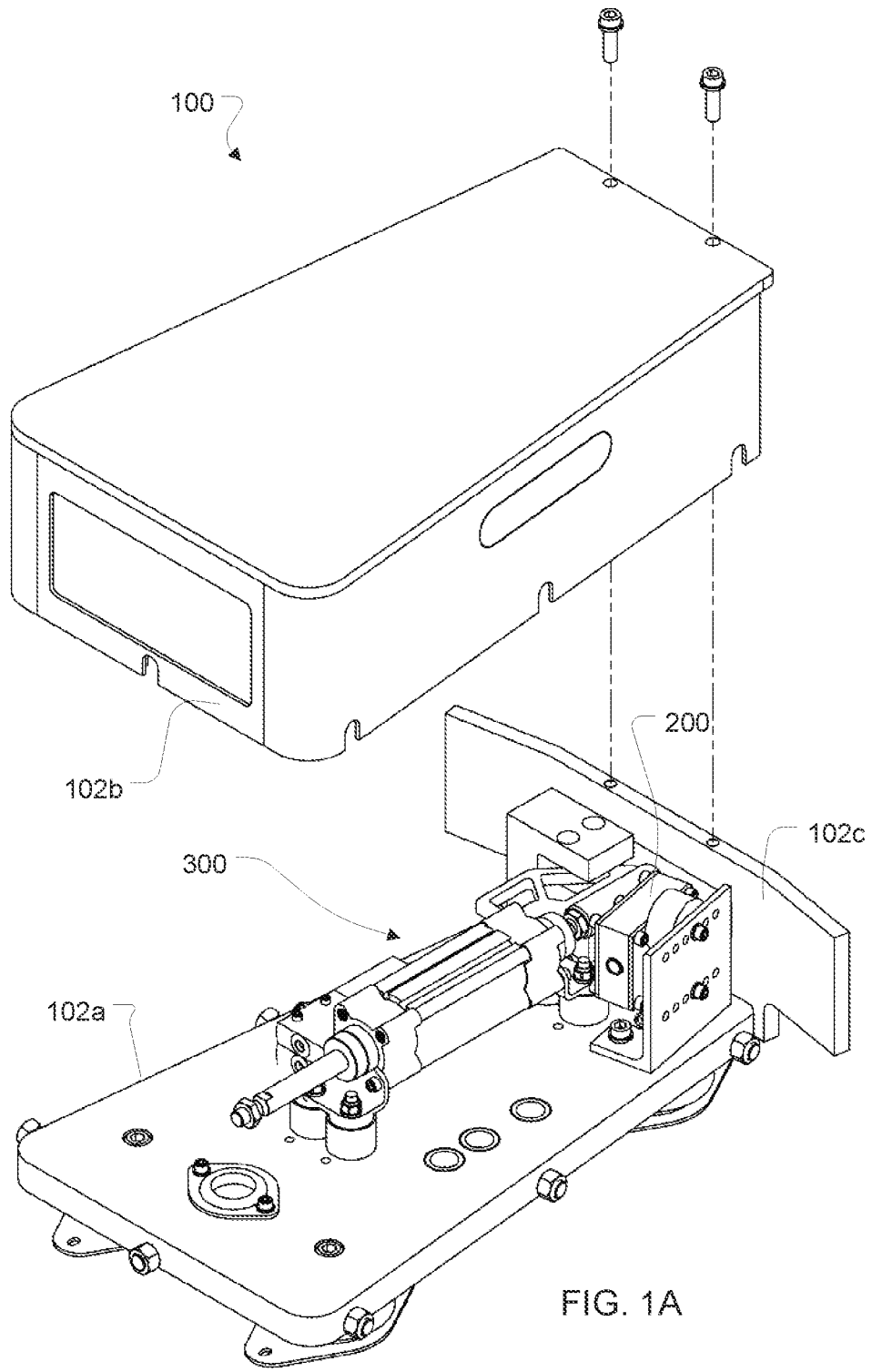
FIGS. 1A-C illustrate a perspective view and plan views of an acoustic grading apparatus.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

The present disclosure describes embodiments of methods, apparatuses, and systems for assessing the strength and/or stiffness of wood workpieces, such as lumber, logs, cants, veneer, engineered wood panels/beams, and the like, based at least in part on the travel time or velocity of an impact-induced acoustic stress wave within the workpiece.

In exemplary embodiments, a computing device may be endowed with one or more components of the disclosed apparatuses and/or systems and may be employed to perform one or more methods as disclosed herein.

As used herein, the terms "face," "side," and "end" are used in reference to portions of a wood workpiece as follows. A "face" of a workpiece is a cut or machined surface that is generally parallel to the longitudinal axis of the workpiece. A "side" of the workpiece is a cut or machined surface that is generally parallel to the longitudinal axis of the workpiece and generally perpendicular to the face(s) of the workpiece. An "end" of the workpiece is a cut or machined surface that is generally perpendicular to the longitudinal axis of the workpiece. For example, a piece of green or finished lumber typically has six cut/machined surfaces—a pair of opposite faces, a pair of opposite sides, and a pair of opposite ends. The "width" of the workpiece is the distance between the opposite sides, the "thickness" of the workpiece is the distance between the opposite faces, and the "length" of the workpiece is the distance between the opposite ends. In the context of a workpiece that is supported on an underlying support such as a conveyor, the faces of the workpiece are the bottom surface (the surface that is in contact with the support) and the opposing top surface of the workpiece. As the workpiece moves along a path of travel in a transverse orientation, the 'leading' side of the workpiece is the side that is downstream of the other side, which is considered the 'lagging' side.

Striking a first end of the workpiece produces a compressive stress wave that travels longitudinally through the workpiece in a first direction from the first end to the second end. This initial compressive stress wave is reflected at the second end as a tensile wave, which travels longitudinally through the workpiece in an opposite second direction from the second end to the first end, and is reflected at the first end as a second compression wave that travels in the first direction from the first end toward the second end. For clarity, as used herein, the term "acoustic stress wave" means the compressive stress waves and tensile waves that travel longitudinally through the workpiece as the result of a single impact against the workpiece. For example, an acoustic stress wave may be detected at the second end of the workpiece as the initial compressive stress wave or the reflected tensile wave. Likewise, an acoustic stress wave may be detected at the first end of the workpiece as the reflected tensile wave or the second compressive stress wave, or detected between the ends as a compressive stress wave or a tensile wave. Similarly, the travel time of an acoustic stress wave may be determined as the travel time of only one wave (e.g., the initial compressive stress wave, or the first tensile wave), or the total travel time of multiple compressive/tensile waves (e.g., the initial compressive stress wave and the initial tensile wave, and/or additional compressive/tensile waves), depending at least in part on the location at which the acoustic stress wave is detected.

As used herein, "time of flight" (TOF) means the time taken by an impact-induced acoustic stress wave to travel longitudinally through the workpiece from a first location along the workpiece to a second location along the workpiece. In some embodiments, the first location is the location of the impact and the second location is the location at which the acoustic stress wave is detected by a detector. Optionally, the first and second locations may be at the same end of the workpiece, and the TOF value of the impact-induced acoustic stress wave may be the travel time of the acoustic stress wave over a distance that is twice the length of the workpiece along its longitudinal axis.

The present disclosure describes embodiments of methods, apparatuses, and systems for assessing the strength or stiffness of a wood workpiece based at least in part on the TOF of an impact-induced acoustic stress wave and/or the velocity at which the wave travels longitudinally through the workpiece. In particular, embodiments described herein may include one or more features configured to reduce error in the determination of the MOE of a wood workpiece.

In one aspect, the present disclosure provides embodiments of a housing for an acoustic transducer of a detector (e.g., a microphone). The housing is configured to retain the acoustic transducer within an interior cavity and to inhibit extraneous acoustic waves and/or contaminants from reaching the acoustic transducer.

In another aspect, the present disclosure provides embodiments of an induction system that is selectively operable to strike a first end of the workpiece multiple times at respective locations along the first end while the workpiece is moved along a path of travel on a conveyor.

In another aspect, the present disclosure provides embodiments of a computer system programmed to determine the modulus of elasticity (MOE) of a wood workpiece based on determined travel times or velocities of acoustic stress waves induced by successive impacts against respective locations along an end of the workpiece.

In another aspect, the present disclosure provides embodiments of an acoustic grading apparatus that includes a support with one or more coupling features for coupling the housing and/or the detector to the support in multiple locations, such that the apparatus can be placed on either side of the path of workpiece travel with the detector downstream of the inductor.

In various embodiments, an acoustic grading system may include any one or more (or all) of the housing, induction system, acoustic grading apparatus, and/or computer system described herein. Embodiments described herein may help to reduce sources of potential error in the detection of acoustic signals, identification of the impact-induced acoustic stress wave, and/or the determination of MOE of a workpiece, as described in further detail below.

One source of potential error is inaccurate detection and/or identification of the impact-induced acoustic stress wave. Ambient noise within a sawmill can exceed 120 decibels (dB). Ambient noise, standing waves, and reverberations in a sound recording environment make distinguishing one sound from another more difficult. Ambient noise may cause extraneous acoustic waves that may reach the detector. Reverberations or standing waves from objects in the immediate vicinity may also reach the detector. Incorrectly identifying any of these waves as the impact-induced acoustic stress wave may result in an inaccurate determination of impact-induced stress wave velocity, and by extension, inaccurate determination of MOE. Moreover, if contaminants such as sawdust and pitch enter the detector or collect in areas between the detector and the workpiece, the contaminants can attenuate and/or distort the incoming sound and may even distort the captured sound. As such, extraneous noise and/or contaminants can cause prior acoustic grading systems to select the wrong acoustic wave frequency or time of flight signal and, as a result, to over-estimate or under-estimate the MOE of the workpiece.

Therefore, the present disclosure provides embodiments of a housing configured to retain a detector (e.g., a microphone) and to reduce exposure of a transducer of the detector (e.g., an acoustic transducer) to extraneous acoustic waves and/or contaminants. The housing may have an interior cavity, a first aperture that extends from a front side of the housing to the interior cavity, and a second aperture that extends from a rear side of the housing to the interior cavity. The first aperture and the second aperture may be aligned along a longitudinal axis. The second aperture may be dimensioned to accommodate a portion of the detector, allowing the sound-detecting portion of the detector to be retained within the interior cavity. The interior cavity may be defined by transverse walls that are oriented transverse to the longitudinal axis, and to one another. Optionally, the transverse walls may be arranged as a polygon with an odd number of sides, with each of the transverse walls forming one of the sides of the polygon. The interior cavity may be further defined by side walls disposed on opposite sides of the longitudinal axis and joined to respective edges of the transverse walls. Optionally, the transverse and/or side walls may have surfaces configured to absorb, attenuate, or redirect acoustic waves away from the center of the interior cavity. For example, the surfaces may be ridged such that the walls have a corrugated shape in cross-section. In use, the detector may be retained through the second aperture with the acoustic transducer positioned within the interior cavity (e.g., at the center of the cavity) and aligned with the first aperture.

In a particular embodiment, the housing includes a base unit and two side units. The base unit includes the transverse walls of the interior cavity, which are arranged to form a regular pentagon. Each of the side units includes a corresponding one the side walls, and the side units are configured to be reversibly coupled to the base unit to thereby join the side walls to the respective edges of the transverse walls to form the interior cavity. The transverse walls and the portions of the side walls that are exposed within the interior cavity have sound baffle ridges to disperse standing acoustic waves. The first aperture permits impact-induced acoustic waves to enter the interior cavity while blocking at least some ambient environmental noise and/or contaminants. Thus, embodiments of a housing as described herein may allow the detector to capture the impact-induced acoustic signal more clearly, increase the accuracy with which the grading system identifies the impact-induced acoustic signal, and/or increase the speed at which the grading system processes the data received from the detector to determine MOE.

Another source of potential error is variability in physical properties that affect the TOF and velocity of the impact-induced acoustic stress wave within a given workpiece. Prior acoustic grading systems attempt to determine the travel time/velocity of one acoustic stress wave induced by a single impact against the workpiece. That travel time or velocity is then used to determine an average MOE.

However, wood is an anisotropic material with physical properties that are direction- and location-dependent, and wood workpieces do not have a uniform strength profile from one end to the other end or from one side to the other side. Different densities may be found along the length and across the width of the workpiece. Some defects such as cracks and knots can reflect acoustic stress waves. Prior systems that detect the acoustic stress wave at the impacted end of the workpiece assume that the acoustic wave was reflected at the opposite end of the workpiece before returning to the impacted end—in other words, that the wave travels the length of the workpiece twice before it is detected. If the acoustic stress wave is reflected (e.g., by a crack or a knot) before it reaches the opposite end of the workpiece, but it is assumed to have traveled to the opposite end of the workpiece before returning, the determined velocity of the wave will be greater than the true velocity.

The travel time of the acoustic stress wave depends in part on the path of the wave through the workpiece, which in turn depends on the location of the impact that induced the wave. Therefore, the location of the mechanical impact that induces the acoustic stress wave can influence the Time of Flight. The induced acoustic stress wave is influenced by the properties of the region of the workpiece through which the wave travels. Acoustic stress waves induced by mechanical impacts at different locations along the end of the same workpiece can have significantly different travel times and/or velocities due to variations in the physical properties along the corresponding paths of travel.

A better representation of the average MOE of workpiece may be obtained by impacting the workpiece at multiple successive locations along the end of the workpiece as the workpiece is transported through the testing area, determining a time of flight value of each of the impact-induced acoustic stress waves, and determining the average MOE based at least in part on the determined TOF values. Such a method may more accurately represent the directional and locational variances in physical properties of the workpiece that affect stiffness and strength.

In some embodiments, the determined TOF values may be averaged. The determined average may be used to determine a representative or average MOE. Optionally, the determined velocities may be compared to an expected velocity, and a determined velocity or that exceeds the expected velocity may be omitted from the determination of the average. Regardless, in some embodiments the lowest TOF and highest TOF values determined for the workpiece may be used to determine a lowest MOE and a highest MOE, respectively, for the workpiece.

Measuring acoustic stress waves induced at multiple locations along the end of the workpiece may allow for a more complete evaluation of the longitudinal strength properties of the workpiece. Using multiple measurements to determine the locations of the lowest and highest strength properties of the workpiece may increase the accuracy of grading/strength classification and/or reduce the number of workpieces that are assigned to incorrect grades (e.g., sub-par/Off Grade workpieces in the wrong strength classification.

Therefore, the present disclosure provides embodiments of an induction system that is selectively operable to strike a first end of the workpiece multiple times while the workpiece is moved along a path of travel on a conveyor. The induction system may include a linear actuator, a contact member connected to a free end of the linear actuator, and a control system. In some embodiments the linear actuator is a double-acting pneumatic cylinder with a piston, the contact member is connected to the free end of the piston, and the control system includes a pair of solenoid valves coupled with respective portions of the pneumatic cylinder. Optionally, the solenoid valves may be fast-switching valves with a switching time of 4 milliseconds (ms) or less, and the induction system may be selectively operable to extend and retract the piston at least six times per second.

In addition, the present disclosure provides embodiments of a computer system programmed to determine the velocities of detected acoustic stress waves induced by successive impacts against respective locations along an end of the workpiece, and to determine an average velocity based on the determined velocities. Determining stiffness based on determined velocities of multiple impact-induced waves within the workpiece may allow a more accurate and/or detailed evaluation of the workpiece from the leading side to the lagging side. Increasing the accuracy of the stiffness determination may in turn result in more uniform content in each segregated strength group.

The present disclosure also provides embodiments of an acoustic grading apparatus that includes a support with one or more coupling features for coupling the detector to the support in a first location and in an alternative second location. For example, in some embodiments the support may include a first coupling feature and a second coupling feature arranged on opposite sides of an inductor (or the intended location of the inductor). The first and second coupling features may be configured to be coupled with the detector or housing either directly or indirectly (e.g., via a bracket or other fastener). Providing multiple coupling features for positioning the detector in the first and second locations allows the grading apparatus to be positioned on either side of the conveyor with the detector downstream of the linear actuator.

In various embodiments, an acoustic grading system may include any one or more (or all) of the housing, induction system, acoustic grading apparatus, and/or computer system described herein.

Embodiments of a housing for an acoustic transducer, an induction system, an acoustic grading apparatus, and corresponding methods and systems are illustrated and described in further detail below. For clarity and ease of reference, embodiments of the housing and the induction system are shown in some of the Figures as components of the acoustic grading apparatus. However, other embodiments of an acoustic grading apparatus can include the housing and a different type of induction system, or include the induction system and omit the housing. Similarly, methods described herein may be performed with other apparatuses/systems than those disclosed herein, except as otherwise noted.

Figure 1B:
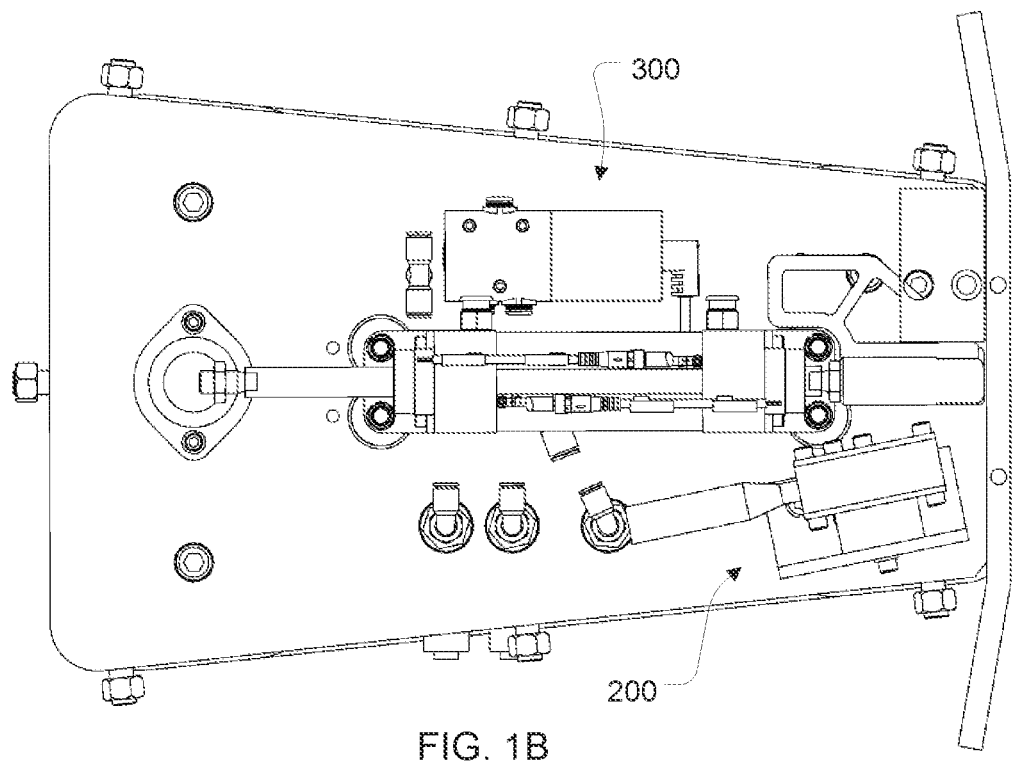
Figure 1C:
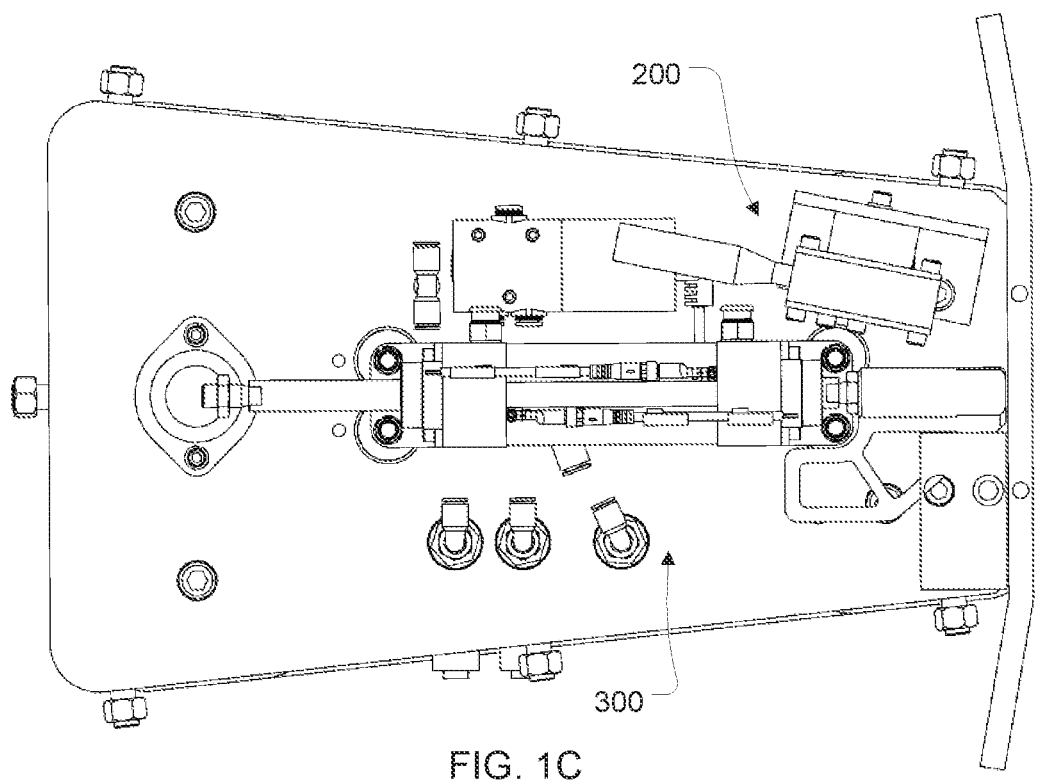
Figure 2A:
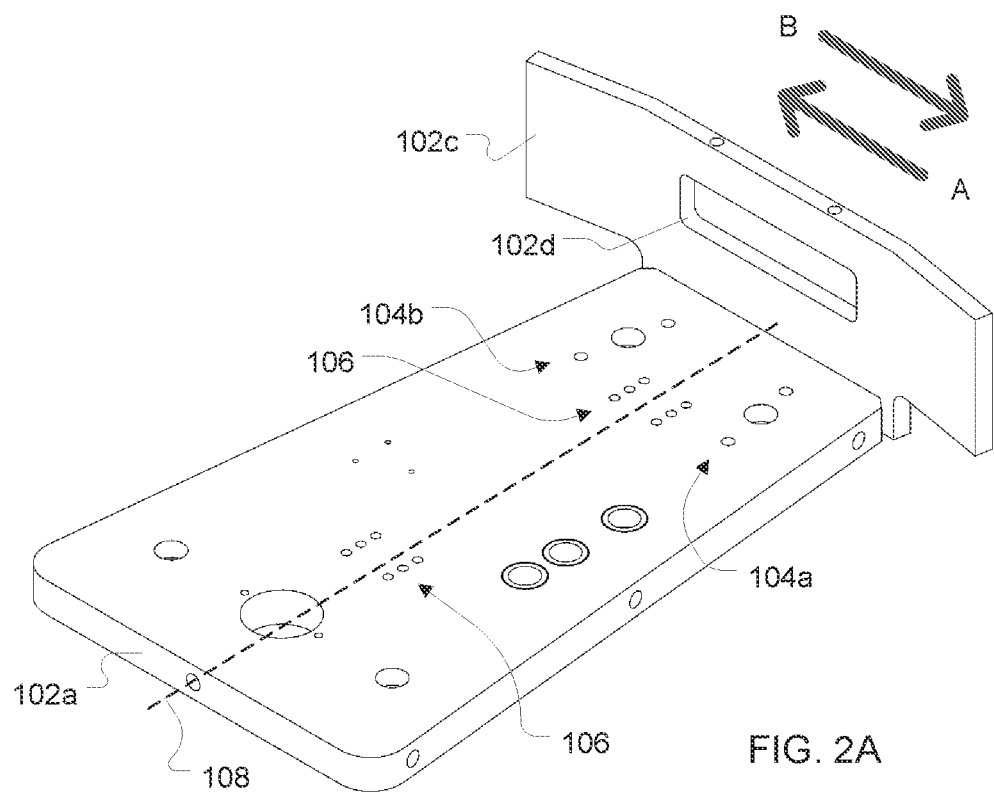
FIGS. 2A-B illustrate perspective and front elevational views, respectively, of components of the apparatus of FIGS. 1A-C.
Figure 2B:
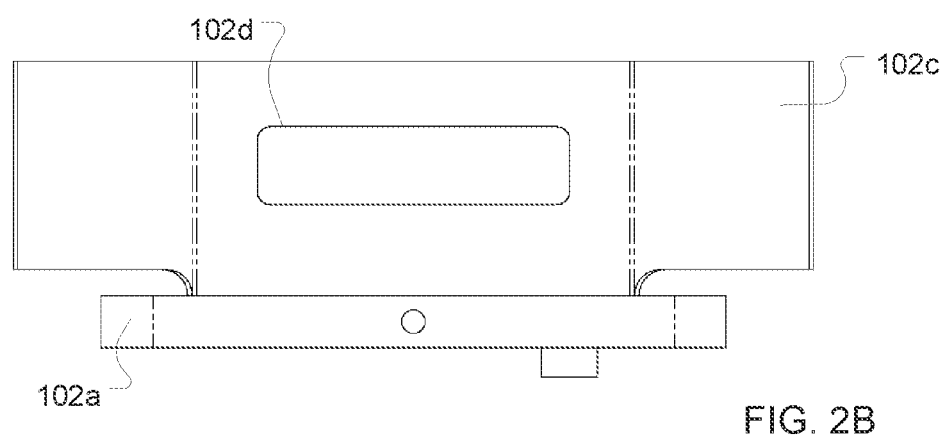

FIGS. 1A-C illustrate an example of an acoustic grading apparatus 100, in accordance with various embodiments. In this example, the apparatus 100 includes a support 102a. Support 102a may be, or may include, a rigid sheet or plate of metal, plastic, or other suitable material. Optionally, enclosure 102 may further include a cover 102b (shown in a detached position for clarity) and/or a deflector 102c. If present, deflector 102c may be (or may include) a flat or angled/curved plate with a through-slot 102d (FIGS. 2A-B). Deflector 102c may be configured to be coupled to a front end of support 102a with the through-slot 102d positioned above a top surface of support 102a. In other embodiments, deflector 102c may be omitted and cover 102b may instead be provided with a through-slot. Alternatively, deflector 102c and cover 102b may be formed as an integrated/one-piece unit with a through-slot, or both deflector and cover 102b may be omitted.

In various embodiments, support 102a may include one or more coupling features such as holes, brackets, and/or mechanical fasteners. In preferred embodiments, support 102a includes a first coupling feature 104a and a second coupling feature 104b arranged on opposite sides of an axis (broken line 108, FIG. 2A) that extends through the front and rear ends of the support 102a. For example, first and second coupling features 104a and 104b may be holes or sets of holes that extend from the upper surface of support 102a at least partially through the thickness of the support 102a. The holes, which may be smooth or threaded, may be dimensioned or otherwise configured to retain bolts, screws, or other mechanical fasteners. Coupling features 104a and 104b may be provided for use to attach a detector (e.g., a microphone) and/or a housing for the detector to the support 102a, either directly or by way of a bracket or other intermediate fastener. Providing two sets of coupling features for this purpose allows the detector or housing to be attached to the support 102a in two different positions relative to the axis. For example, first coupling feature 104a (shown to the left of the axis in FIG. 2A) may be used to attach a detector to the support 102a on one side of the axis to detect acoustic stress waves in workpieces transported in a first direction (arrow A), and second coupling feature 104b may be used to attach the detector to the support 102a on the other side of the axis to detect acoustic stress waves in workpieces transported that are moving in a second direction (arrow B) that is opposite to the first direction.

Optionally, the support 102a may also have one or more coupling features 106 (e.g., holes and/or mechanical fasteners) for attaching a linear actuator or other inductor to support 102a. If present, coupling features 106 are preferably arranged for use to position the linear actuator or other inductor between first and second coupling features 104a and 104b.

An example of a housing 200 for an acoustic detector is shown in FIGS. 3A-6B. Referring first to FIGS. 3A-F, in some embodiments housing 200 may include a first aperture 202, a second aperture 204, and an interior cavity 214. The first aperture 202 may extend from a front side 218 of the housing to a proximal portion of the interior cavity 214. The second aperture 204 may extend from a distal portion of the interior cavity 214 to a rear side 220 of the housing. The interior cavity may be disposed between the front side 218 and the rear side 220, and between a top side 222 and a bottom side 224, of the housing.

In the illustrated example, the housing 200 includes a base unit 210 and a pair of side units 220a and 220b. The side units are configured to be coupled to respective lateral sides 226 (see e.g., FIG. 6B) of base unit 210. The side units 220a and 220b may be coupled to base unit 210 by fasteners 208a, which may be bolts, screws, adhesives, and/or by any other suitable fastening means.

Optionally, in some embodiments the housing 200 may also include an insert 206 and/or one or more fasteners 208b. If present, insert 206 may have an outer surface that is dimensioned to fit within second aperture 204 and an interior lumen or aperture configured to retain a portion of the detector therein. Fastener(s) 208b may be disposed through one or both sides of the housing 200 to contact the side(s) of insert 206 and/or the detector to thereby secure the insert/detector in a desired position Other embodiments may lack one or both of insert 206 and/or fastener(s) 208b.

The first aperture 202 and the second aperture 204 may be aligned along a longitudinal axis 228 that extends through the front and rear sides of the housing 200 (see FIG. 3D).

The interior cavity 214 may be defined by transverse walls 212 that are oriented transverse to the longitudinal axis 228, and to one another. Transverse walls 212 may be arranged as a polygon, with each of the transverse walls forming a respective side of the polygon. Optionally, the transverse walls 212 may be arranged as a polygon with an odd number of sides.

The interior cavity 214 may be further defined by side walls 230a and 230b disposed on opposite sides of the longitudinal axis 228. The side walls 230a and 230b may be joined to respective edges of the transverse walls 212 to thereby enclose the open ends of the polygon. In some embodiments the side walls 230a and 230b may be surfaces of respective side units 220b, which may be reversibly or permanently coupled to the base unit 210. Alternatively, one or both of the side walls and/or side units may be integral to the base unit 210. For example, the housing 220 may be formed as an single unit by 3D printing with nylon filament and/or other materials, or by other known techniques. Likewise, if the housing includes a base unit and separate side wall(s), any of all of those components may be constructed by 3D printing with nylon filament and/or other materials, or by other known techniques.

Figure 4A:
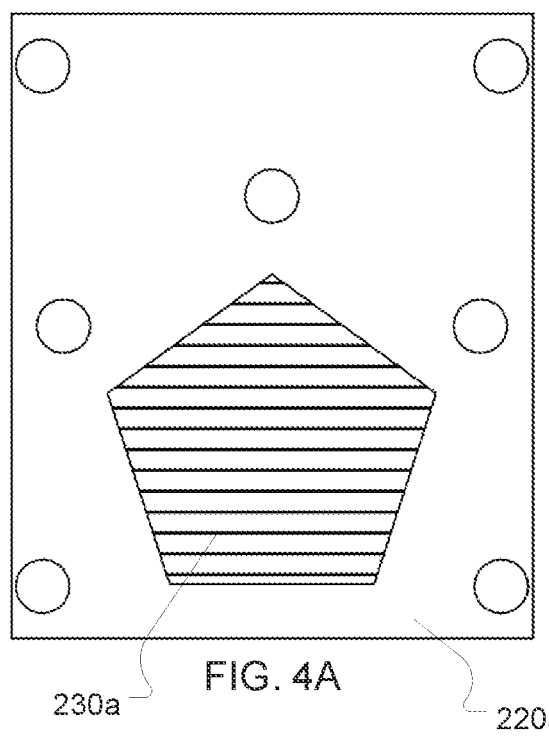
Figure 4B:
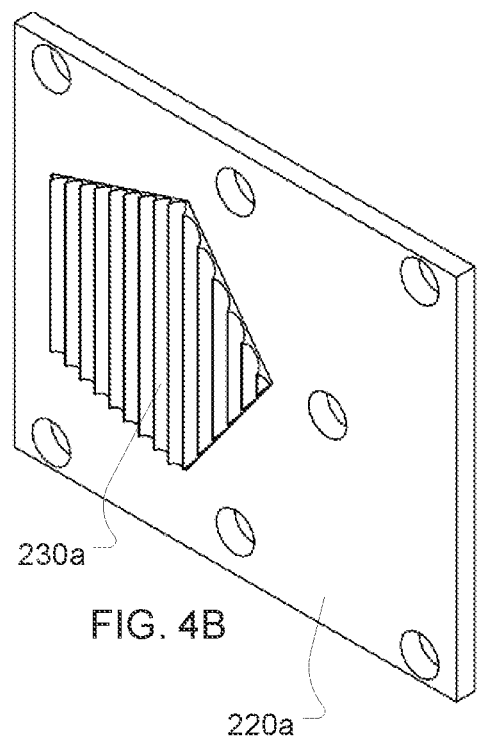
Figure 4C:
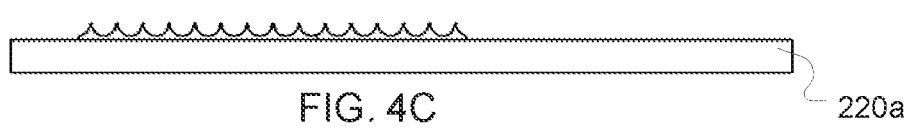
Figure 5A:
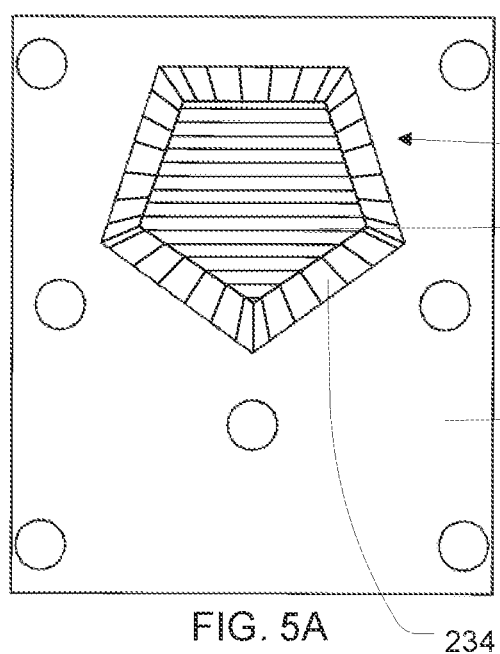
Figure 5B:
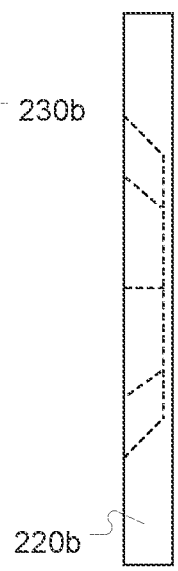
Figure 5C:
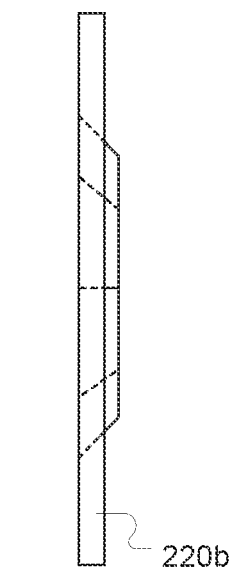

In some embodiments side walls 230a and 230b may be substantially planar. Alternatively, each of the side walls may have ridges with peaks that are coplanar (FIGS. 4A-C). In other embodiments the side walls may have a polygonal portion 232 that protrudes outwardly or inwardly from the interior cavity 214 and sloped intermediate walls 234 that extend from the polygonal portion to the transverse walls 212 (FIGS. 5B-C). Again, in some embodiments the side walls 230 and/or the polygonal portion 232 may have an odd number of sides. In a particular embodiment, the side walls and/or polygonal portion may be in the shape of a pentagon.

Optionally, the transverse walls 212, the side walls 230a and 230b, polygonal portion 232, and/or intermediate walls 234 may have respective surfaces configured to absorb, attenuate, or redirect acoustic waves away from the center of the interior cavity. For example, some or all of the surfaces may be ridged such that the walls have a corrugated shape in cross-section. In some embodiments the side walls 230a and 230b (or polygonal portion 232 and/or intermediate walls 234) may be tilted relative to one another and relative to the longitudinal axis 228.

In some embodiments, the base unit includes the transverse walls of the interior cavity, which are arranged to form a regular pentagon. Each of the side units includes a corresponding one the side walls, and the side units are configured to be reversibly coupled to the base unit to thereby join the side walls to the respective edges of the transverse walls to form the interior cavity. The transverse walls and the portions of the side walls that are exposed within the interior cavity have sound baffle ridges to disperse standing acoustic waves. The first aperture permits impact-induced acoustic waves to enter the interior cavity while blocking at least some ambient environmental noise and/or contaminants.

In a particular embodiment, the longitudinal axis 228 lies within a first plane that extends through the lateral sides of the body and within a second plane that extends through the top and bottom of the body perpendicular to the first plane. The body includes a plurality of first interior surfaces that form respective transverse walls 212 of an interior cavity 214. The transverse walls are oriented transverse to the longitudinal axis and to one another, and they include a first wall 212a that is oriented perpendicular to the first plane and defining a first end of the interior cavity, a second wall 212b and a third wall 212c that meet along the first plane at an opposite second end of the interior cavity 214, and an even number of additional walls connecting the first wall to the second and third walls. Optionally, the additional walls are a fourth wall 212d that extends from one end of the first wall 212a to the third wall 212c and a fifth wall 212e that extends from the other end of the first wall 212a to the second wall 212b (see e.g. FIG. 3D), such that the transverse walls form a pentagon. In some embodiments the pentagon may be a regular (e.g., equilateral) pentagon.

Regardless, the first aperture 202 may be dimensioned/shaped to permit impact-induced acoustic waves to enter the interior cavity while blocking at least some ambient environmental noise and/or contaminants. Optionally, the first aperture 202 may extend through the first wall 212a and the second aperture 204 may extend through the interface of second and third walls 212b and 212c. One or both of the apertures may be round. The interior cavity 214 may be configured to reduce reverberations and/or standing waves.

The second aperture 204 may be dimensioned to accommodate a portion of an acoustic detector, allowing the sound-detecting portion of the detector to be retained within the interior cavity 214.

Figure 6A:
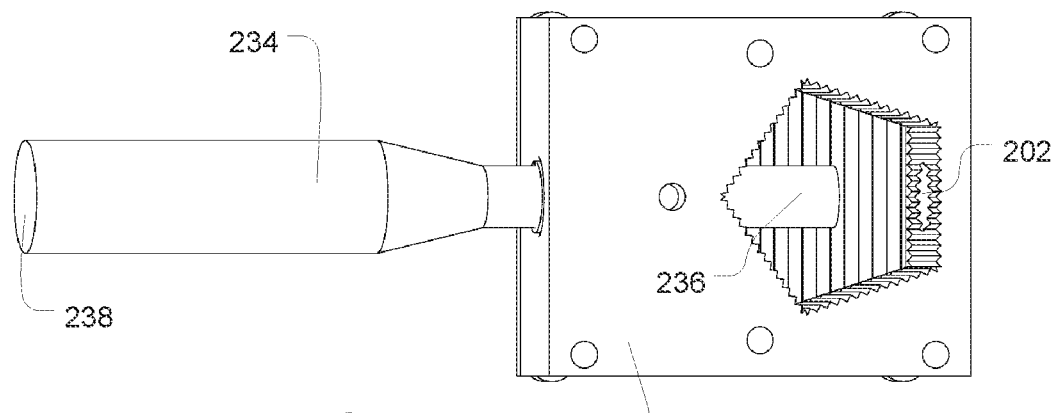
FIGS. 6A-C illustrate components of a housing in combination with an acoustic detector.
Figure 6B:
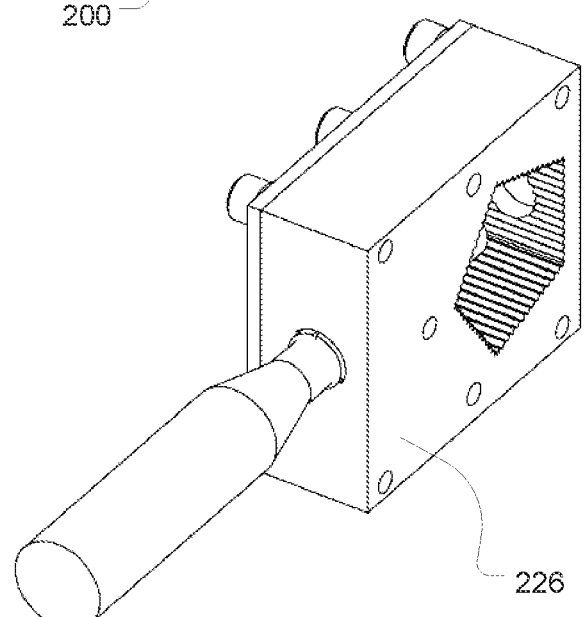
Figure 6C:
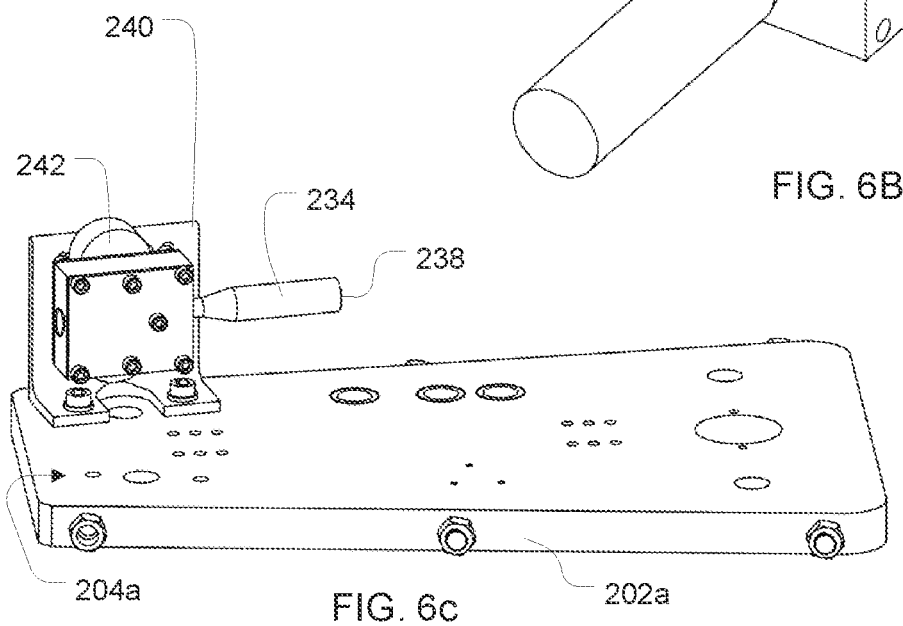
Figure 7A:
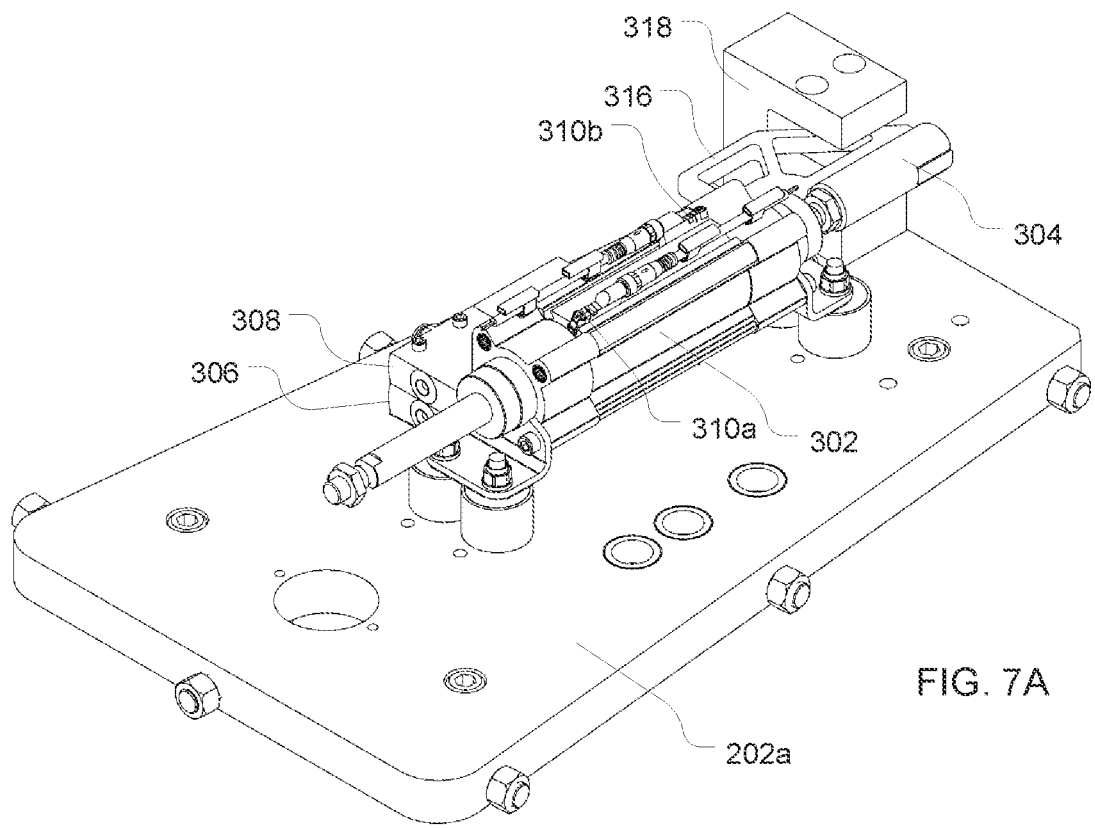
FIGS. 7A-D illustrate components of an inductor system.
Figure 7B:
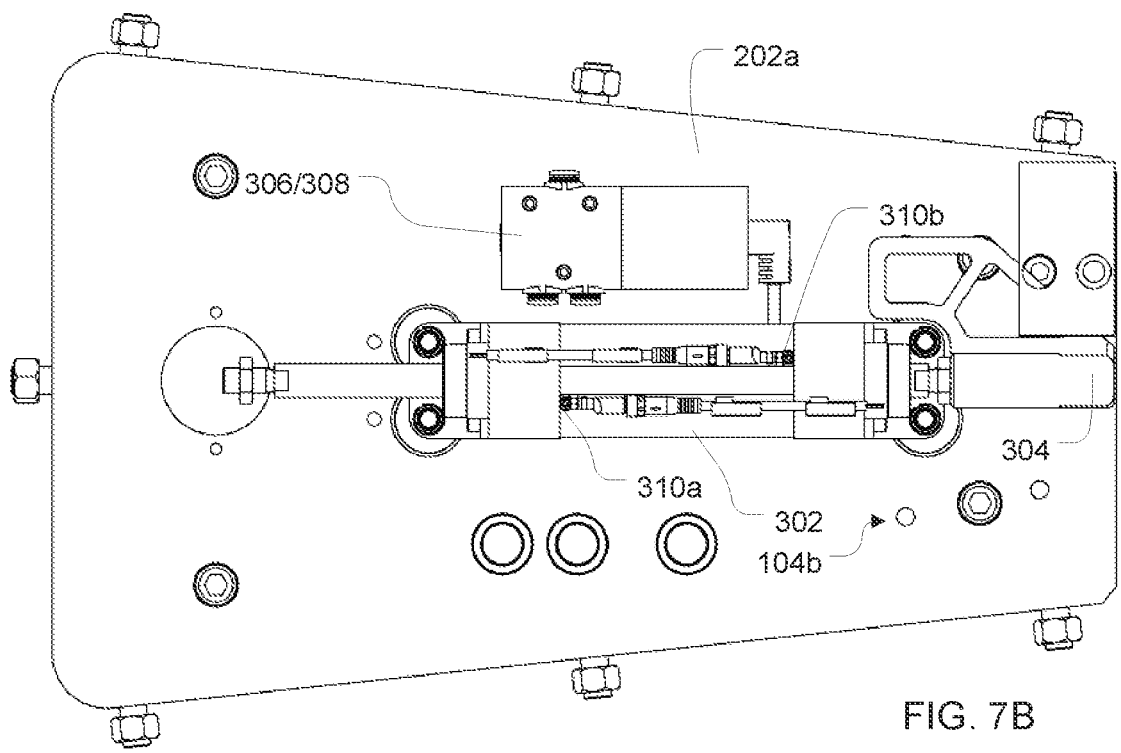
Figure 7C:
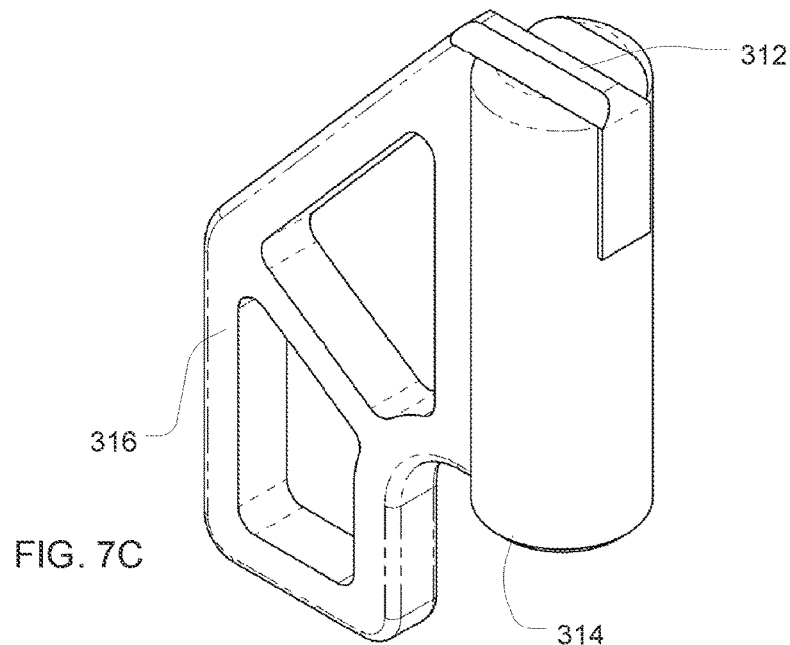
Figure 7D:
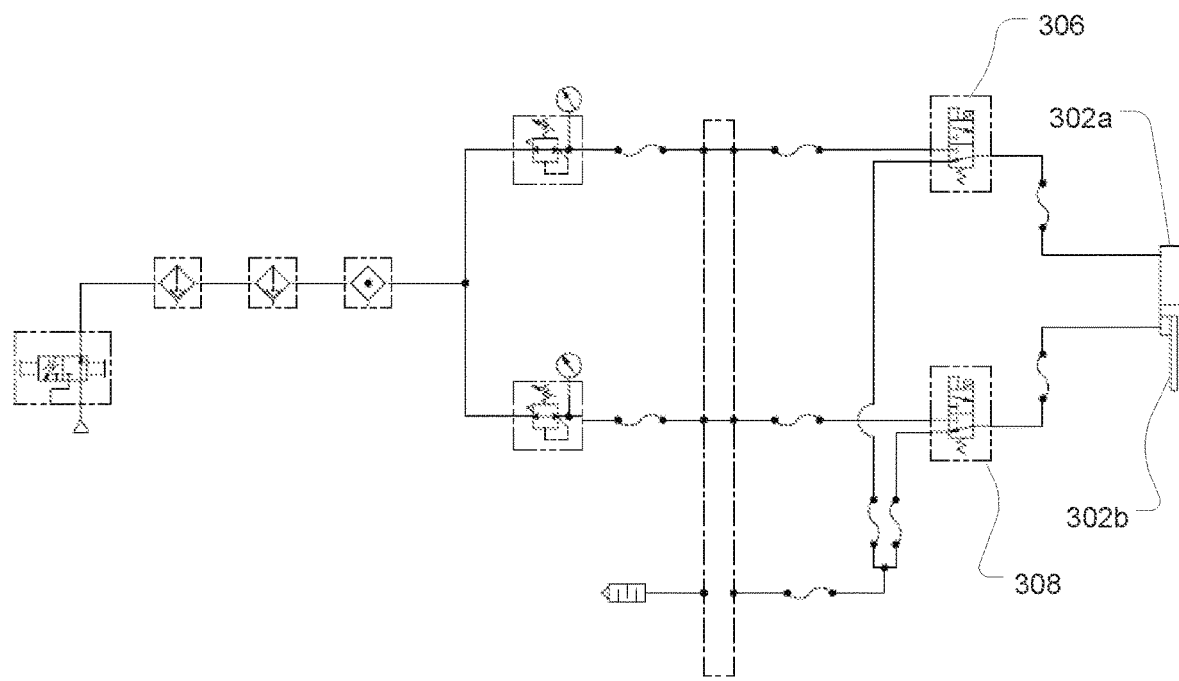

In some embodiments the acoustic detector may have a first end and a second end, and a transducer disposed at or within the first end. An example of an acoustic detector is shown in FIGS. 6A-C. In this example, the acoustic detector 234 is a microphone with a first end 236 and a second end 238. The transducer is located at or within the first end 236. The first end 236 is positioned within the interior cavity, preferably at the center of the interior cavity and in axial alignment with the first aperture. The detector may be coupled with the housing 200 by inserting the first end 236 through the second aperture 204 and advancing it through the second aperture 204 until the first end 236 is at the center of the interior cavity 214. In use, the housing 200 may be positioned along the path of travel of the workpieces (e.g., to one side of the conveyor) with the first aperture located between the interior cavity 214 of the housing and the path of travel of the workpieces.

In various embodiments, housing 200 may help to block some of the ambient noise, reverberations, standing waves, and/or contaminants that could otherwise reach the detector and adversely affect the accuracy of the acoustic wave detection/capture and, by extension, the determination of the strength/stiffness of the workpiece. This may aid the detection and identification of the impact-induced acoustic stress wave. As a result, the housing may allow the detector to capture the impact-induced acoustic signal more clearly, increase the accuracy with which the grading system identifies the impact-induced acoustic signal, and/or increase the speed at which the grading system processes the data received from the detector to determine MOE.

In some embodiments, housing 200 may be coupled to support 202a of the acoustic grading apparatus by bolts or other fasteners (FIG. 6C). For example, a bracket 240 may be coupled to the support 202a by bolts or other fasteners disposed through the bracket and first or second coupling features 104a or 104b. Optionally, vibration dampers/isolators or other vibration-reducing elements 242 may be disposed between housing 200 and bracket 240. Other embodiments of the acoustic grading apparatus may lack housing 200.

In various embodiments, an induction system is selectively operable to strike a first end of an elongated wood workpiece (e.g., a board) multiple times while the workpiece is moved along a path of travel on a conveyor. An example of an induction system 300 is shown by way of example in FIGS. 7A-D.

In some embodiments, the induction system 300 includes a linear actuator 302, a contact member 304 connected to a free end of the linear actuator, and a control system. In some embodiments the linear actuator 302 is a double-acting pneumatic cylinder with a cylinder 302a and a piston 302b, and the contact member 304 is connected to the free end of the piston. The control system includes a pair of solenoid valves 306 and 308 coupled with respective first and second portions of the pneumatic cylinder. Optionally, the solenoid valves 306 and 308 may be fast-switching valves with a switching time of 4 milliseconds (ms) or less, and the induction system 300 may be selectively operable to extend and retract the piston at least six times per second. A schematic of a suitable pneumatic control system is shown by way of example in FIG. 7D.

Optionally, first and second proximity sensors 310a and 310b may be operatively coupled with the linear actuator to detect the positions of the piston during extension and retraction, respectively.

In some embodiments, linear actuator 302 may be mounted to support 102a by nuts, bolts, or other fasteners, either directly or via one or more brackets and/or vibration dampers/isolators or other vibration-reducing elements 242. Optionally, the linear actuator 302 is positioned between first and second coupling features 104a and 104b.

Contact member 304 may have a distal end 312 for striking the end of the workpiece. An opposite proximal end 314 of the contact member may be configured to be coupled to the distal end of the piston or other movable member of linear actuator 302. Optionally, contact member 304 may have a guide portion 316, and a corresponding guide member 318 may be mounted to the support 102a. If present, guide portion 316 may be a lateral ridge or other protrusion, and guide member 318 may have a corresponding notch through which the guide portion moves as the contact member is extended and retracted. This configuration may help to reduce or prevent rotation of the contact member during rapid operation.

Figure 8A:
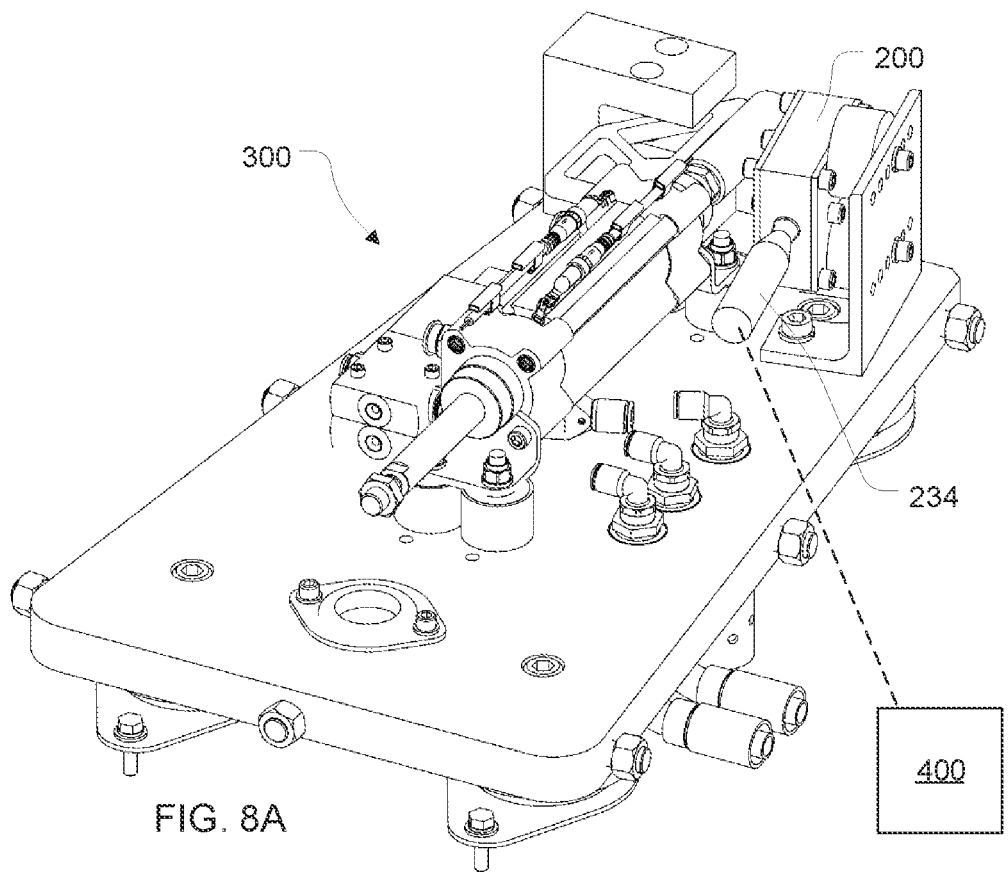
FIGS. 8A-C illustrate perspective, front elevational, and plan views of an acoustic grading system with a housing and an inductor system.
Figure 8B:
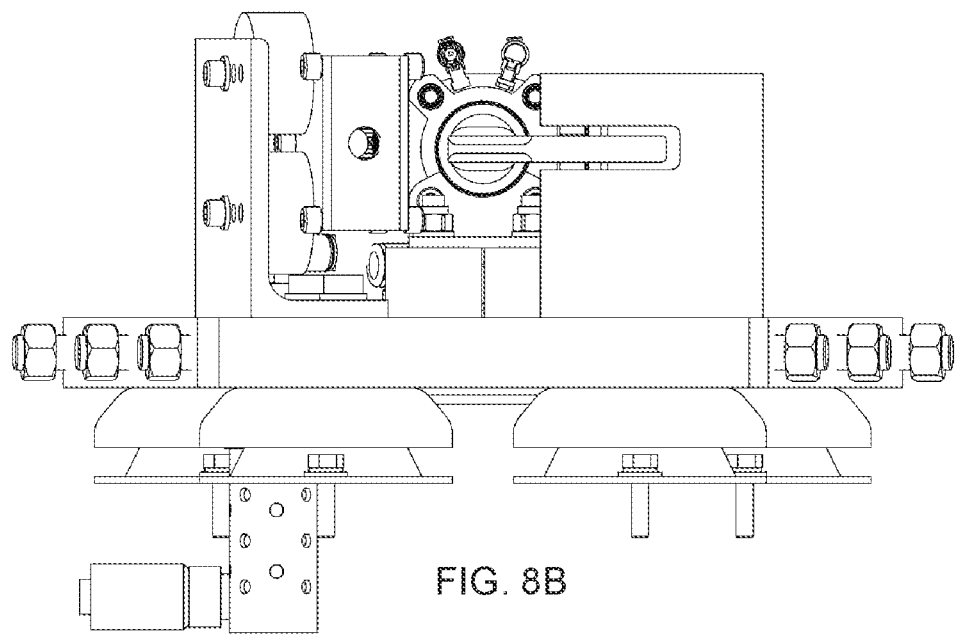
Figure 8C:
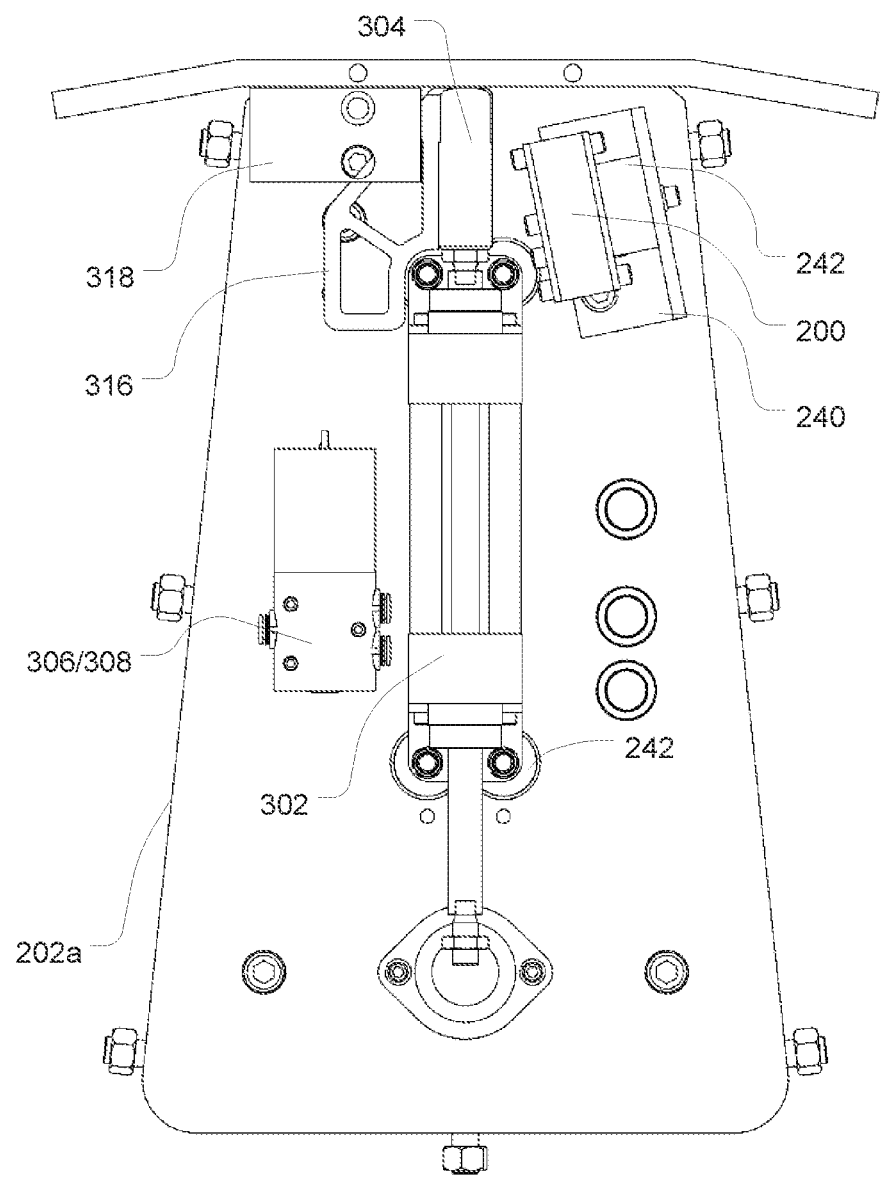

An acoustic grading apparatus that includes support 102a, induction system 300, and housing 200 is shown by way of example in FIGS. 8A-C. Optionally, the apparatus may further include a detector 234 (e.g., a microphone) coupled with housing 200 and/or computer system 400.

In various embodiments, computer system 400 is programmed to receive electronic signals from the detector 234 and to determine, based on the data received from the detector, the TOF values and/or velocities of acoustic stress waves induced by successive impacts against respective locations along an end of the workpiece. Computer system 400 may determine an average MOE for the workpiece based on the determined velocities. Determining stiffness based on determined velocities of multiple impact-induced waves within the workpiece may allow a more accurate and/or detailed evaluation of the workpiece from the leading side to the lagging side. Increasing the accuracy of the stiffness determination may in turn result in more uniform content in each segregated strength group.

An acoustic grader may be used to assess the stiffness of an elongated wood workpiece as the workpiece moves along a path of travel on a conveyor. The acoustic grader includes an inductor that is selectively actuable to strike the workpiece and a detector that is configured to detect impact-induced acoustic stress waves traveling longitudinally through the workpiece. In various embodiments, a method of using such an acoustic grader includes causing the inductor to strike an end of the workpiece at a first location along said end as the workpiece moves along the path of travel on a conveyor and determining a velocity of the first acoustic stress wave within the workpiece based on data received from the detector. The method may further include causing the inductor to strike the end of the workpiece at a second location along said end as the workpiece moves along the path of travel on the conveyor and determining a velocity of the second acoustic stress wave within the workpiece based on data received from the detector. The method may further include estimating a modulus of elasticity (MOE) of the workpiece based at least in part on the determined velocities. In some embodiments, the determined velocities may be averaged and the MOE may be determined based at least in part on the average of the determined velocities.

In various embodiments, a grading system may include acoustic grading apparatus 100 and computer system 400. Optionally, the acoustic grading system may further include a system for weighing the workpieces as they move along the path of travel and/or a grade scanner. Regardless, the weight or specific gravity of the workpieces and visual grading rules may be used to qualify selected workpieces, such as boards, in mill production for MOE evaluation.

FIGS. 9A-B and 10A-C illustrate a workpiece processing line with a grading system 500, in accordance with various embodiments.

Figure 9A:
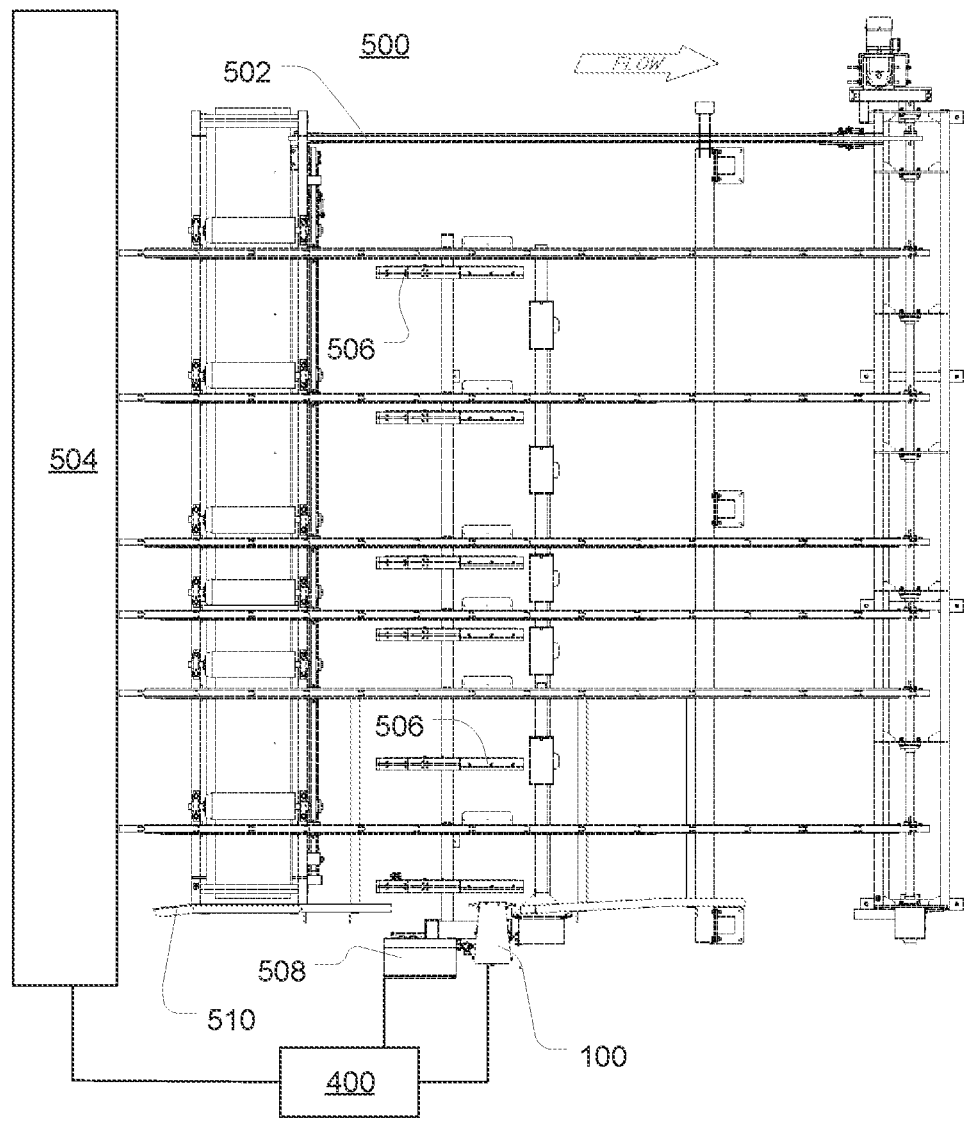
FIGS. 9A and 9B illustrate plan views of a workpiece processing line with a grading system.
Figure 9B:
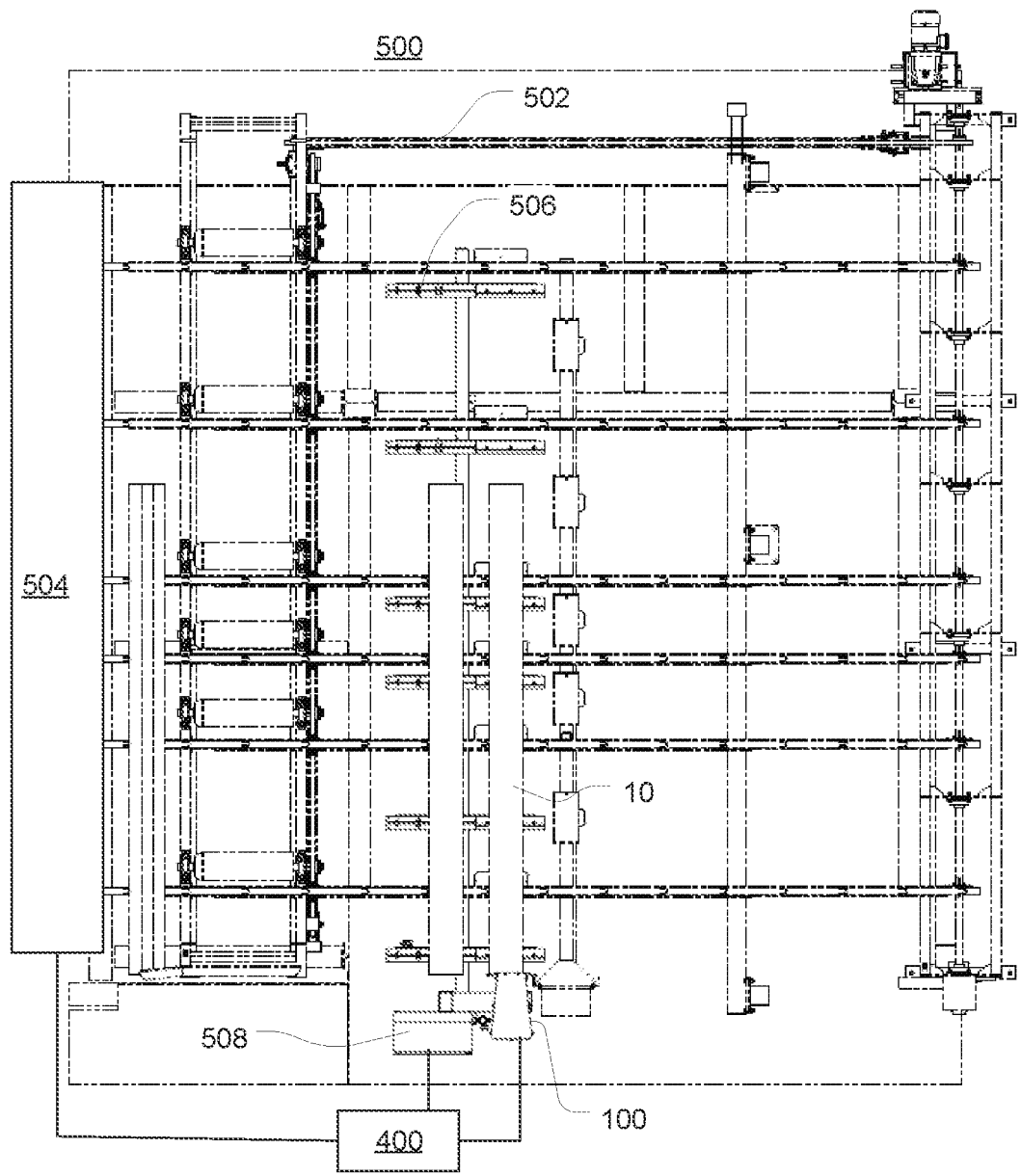
Figure 10A:
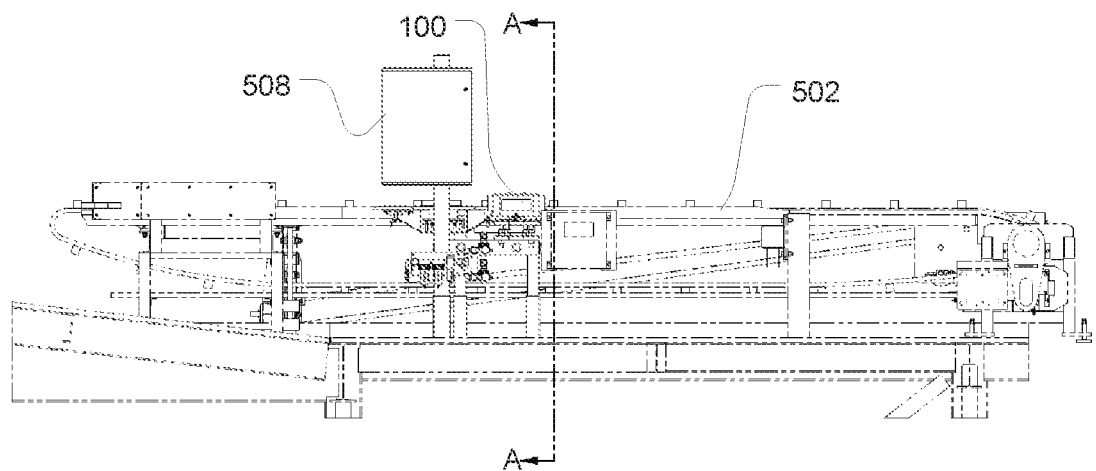
FIG. 10A is a side elevational view of the workpiece processing line of FIG. 9B.
Figure 10B:
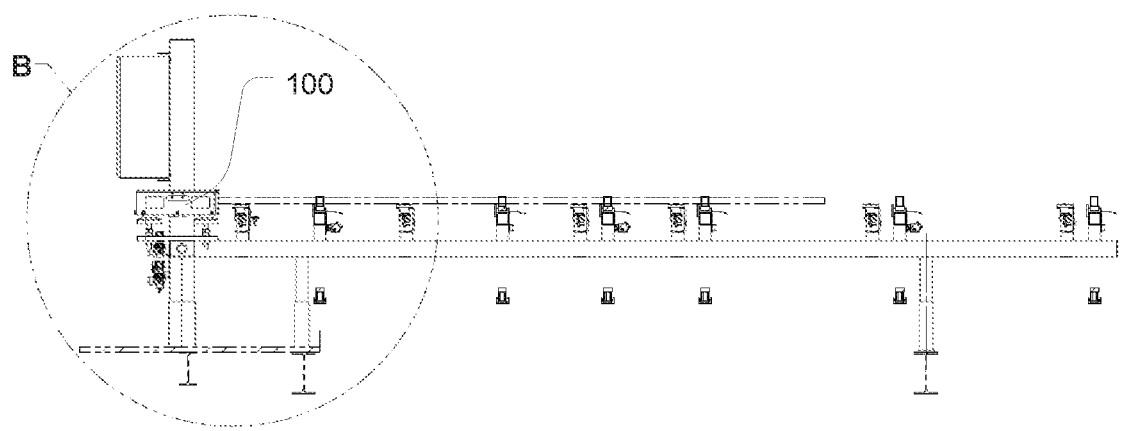
FIG. 10B is a sectional view taken along line A-A of FIG. 10A.
Figure 10C:
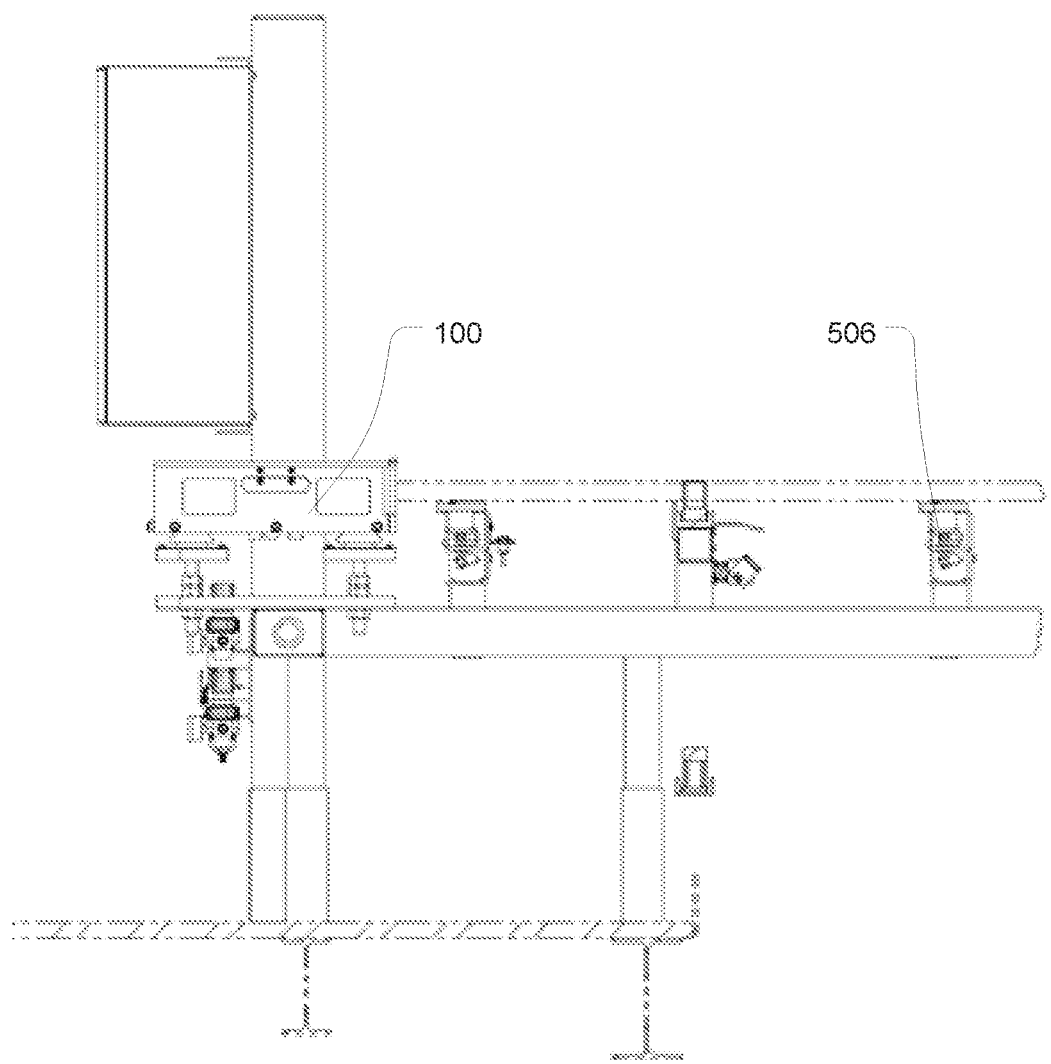
FIG. 10C is an enlarged view of portion B of FIG. 10B, all in accordance with various embodiments.

As best shown in FIGS. 9A and 9B, the workpiece processing line 500 may include a conveyor 502 configured to move the workpieces along the path of travel (arrow). Preferably the conveyor is a lugged conveyor. Acoustic grading apparatus 100 is positioned along one side of the conveyor. Optionally, a board end guide 510 (e.g., a stationary fence or moving fence) may be provided upstream of the acoustic grading apparatus 100. If present, the board end guide 510 is configured to align the ends of the workpieces to thereby aid in positioning the workpieces relative to the acoustic grading apparatus.

Optionally, the workpiece processing line 500 may further include means for measuring the weight and/or density of the workpieces. For example, in some embodiments a plurality of load cell assemblies 506 may be positioned between the belts/chains of the conveyor 502. The load cell assemblies include one or more load cells. Collectively, the load cell assemblies are configured to measure the weight of the workpiece as it travels along the conveyor. Optionally, the load cell assemblies may be coupled with a panel 508 that receives data from the load cells. The panel 508 may be in communication with computer system 400.

A grading scanner 504 may be positioned along the path of travel. While FIGS. 9A and 9B show the grading scanner upstream of the acoustic grading apparatus 100, the grading scanner may instead be positioned downstream of the acoustic grading apparatus. Regardless, the grading scanner may be in communication with computer system 400.

The grading scanner and/or computer system 400 may receive, or may determine based on data obtained by the grading scanner and/or other sensors, various parameters for the board such as length, width, thickness, and volume. The grading scanner and/or computer system 400 may also receive predicted grades for some or all of the workpieces and/or may control the acoustic grader to tap only the workpieces identified by the grading scanner as potential grade boards.

In operation, the workpieces may be transported to the acoustic grading apparatus 100 on a timed, lugged chain conveyor (conveyor 502) with each workpiece in a separate lug space. The conveyor 502 may include a pulse encoder, and the computer system 400 may track the lugged chain movement based on data from a pulse encoder. Again, the workpieces may be scanned by grading scanner 502 upstream or downstream of the acoustic grading apparatus. Workpiece data including lug ID, length, width, thickness (and optionally, specific gravity and/or scanner determined grade) may be delivered to computer system 400 (e.g., by the grading scanner) by any suitable method, such as over a network. The data may be delivered from the conveyor encoder. A sensor (e.g., a photocell) upstream of the acoustic grading apparatus 100 recognizes the approaching workpiece and computer 400 retrieves the workpiece data for the detected workpiece.

If a weighing system is present, the workpiece is preferably weighed upstream of the acoustic grading apparatus.

With workpiece data and weight, the specific gravity is calculated for the approaching board. If specific gravity is received from the grading scanner, the received dimensions and specific gravity are used.

At a predetermined distance from the upstream sensor, the inductor (e.g., pneumatic cylinder) is actuated to strike the workpiece at least once at a first end of the workpiece. Preferably, the inductor is actuated to strike the first end of the workpiece multiple times at corresponding locations along the end of the workpiece as the workpiece moves along the path of travel. The detector 234 detects the impact-induced acoustic stress wave(s), and computer 400 uses the data received from the detector to determine the stiffness or MOE of the workpiece. The acoustic characteristics of the reverberating sound wave is analyzed by computer 400 and together with the workpiece dimensions and specific gravity, the MOE value is calculated based on the full length of the board. The MOE is then transmitted to one or more grading/sorting computer(s).

Based on mill controlled visual grade rules (and/or X-ray equivalent grade rules) and mill-determined MOE grade boundary values, the qualified workpieces are directed by the mill systems to the proper destination for sorting. The data from the grading scanner and the acoustic grading system is transmitted to the mill network and is also displayed on the screen in a "rolling" display. This collected data is also stored in a Log File in the computer system 400 for further data analysis.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A housing for an acoustic transducer, wherein the acoustic transducer has a first end, an opposite second end, and a middle portion between said ends, and the acoustic transducer is configured to detect acoustic waves at said first end, the housing comprising:
   a body having
      a plurality of exterior surfaces that define a front, a rear, a top, a bottom, and first and second sides of the body,
      a longitudinal axis that extends through the front and rear of the body, wherein the longitudinal axis lies within a first plane and a second plane, the first plane extends through the sides of the body, and the second plane extends through the top and bottom of the body perpendicular to the first plane,
      a plurality of first interior surfaces that form respective transverse walls of an interior cavity, wherein the transverse walls are oriented transverse to the longitudinal axis and to one another, and wherein the respective transverse walls are a first wall oriented perpendicular to the first plane and defining a first end of the interior cavity, a second and a third wall that meet along the plane at an opposite second end of the interior cavity, and an even number of additional walls connecting the first wall to the second and third walls,
   a first aperture that extends from the front of the body to the first end of the interior cavity, and
   a second aperture that extends from the rear of the body to the second end of the interior cavity, wherein the first and second apertures are in axial alignment along the longitudinal axis,
   wherein the housing is configured to retain the middle portion or the second end of the acoustic transducer within the second aperture to thereby retain the first end of the acoustic transducer within the interior cavity in axial alignment with the first aperture.

2. The housing of claim 1, wherein said first interior surfaces form a plurality of alternating ridges and furrows, such that within the second plane, the transverse walls have corrugated cross-sectional shapes.

3. The housing of claim 1, further including a pair of second interior surfaces disposed on opposite sides of the longitudinal axis and oriented parallel to the second plane, wherein the second interior surfaces define respective sides of the interior cavity.

4. The housing of claim 3, wherein the body is formed as a unit and the first and second interior surfaces are integral to the body.

5. The housing of claim 3, wherein the housing includes a first cover configured to be removably coupled to the first side of the body, and wherein one of the second interior surfaces is a surface of the first cover.

6. The housing of claim 5, wherein the housing includes a second cover configured to be removably coupled to the second side of the body, and wherein the other one of the second interior surfaces is a surface of the second cover.

7. The housing of claim 4, wherein the second interior surfaces have alternating ridges and furrows, such that along the first plane, the second interior surfaces have corrugated cross-sectional shapes.

8. The housing of any one of claim 7, further including a hollow sleeve dimensioned to fit within the second aperture and configured to retain a portion of the acoustic transducer therein.

9. The housing of any one of claim 8, wherein the additional walls are a fourth wall that extends from the first wall to the second wall and a fifth wall that extends from the first wall to the third wall, such that a cross-section of the interior cavity along the second plane is pentagonal.

10. A method of using an acoustic grader to assess the stiffness of an elongated wood workpiece as the workpiece moves along a path of travel on a conveyor, wherein the acoustic grader includes an inductor that is selectively actuable to strike the workpiece and a detector that is configured to detect impact-induced acoustic stress waves traveling longitudinally through the workpiece, the method comprising:
   causing the inductor to strike an end of the workpiece at a first location along said end as the workpiece moves along a path of travel on a conveyor to thereby induce a first acoustic stress wave within the workpiece,
   determining a velocity of the first acoustic stress wave within the workpiece based on data received from the detector;
   causing the inductor to strike the end of the workpiece at a second location along said end as the workpiece moves along the path of travel on the conveyor to thereby induce a second acoustic stress wave within the workpiece;

determining a velocity of the second acoustic stress wave within the workpiece based on data received from the detector;

estimating a modulus of elasticity (MOE) of the workpiece based at least in part on the determined velocities.

11. The method of claim 10, wherein estimating the MOE of the workpiece includes determining an average of the determined velocities and estimating the MOE based on the determined average.

12. The method of claim 10, further including:

determining a lowest velocity and a highest velocity of the acoustic stress waves for the workpiece; and determining a lowest MOE and a highest MOE for the workpiece based on the determined lowest and highest velocities.

13. A grading system for grading an elongated wood workpiece, the grading system comprising:

an acoustic strength grading apparatus having
a support with a first coupling feature and a second coupling feature that are disposed on opposite sides of a longitudinal axis that extends through a front side and a rear side of the support;
an acoustic transducer mounted to the support and configured to detect impact-induced acoustic stress waves; and
an inductor mounted to the support, wherein the inductor includes
a double-acting pneumatic cylinder having a first piston, and
a first and a second solenoid valve coupled with respective first and second portions of the pneumatic cylinder, wherein the first and second solenoid valves are selectively operable to extend and retract the first piston, respectively, wherein the inductor is selectively operable to extend and retract the piston at least six times per second.

14. The grading system of claim 13, wherein the acoustic strength grading apparatus further includes a housing mounted to one of the one of the coupling features, wherein a first end of the acoustic transducer is disposed within the housing and the pneumatic cylinder is disposed along the longitudinal axis.

15. The grading system of claim 14, wherein the housing includes a body having
a plurality of exterior surfaces that define a front, a rear, a top, a bottom, and first and second sides of the body,
a second longitudinal axis that extends through the front and rear of the body, wherein the second longitudinal axis lies within a first plane and a second plane, the first plane extends through the sides of the body, and the second plane extends through the top and bottom of the body perpendicular to the first plane,
a plurality of first interior surfaces that form respective transverse walls of an interior cavity, wherein the transverse walls are oriented transverse to the longitudinal axis and to one another, and wherein the respective transverse walls are a first wall oriented perpendicular to the first plane and defining a first end of the interior cavity, a second and a third wall that meet along the plane at an opposite second end of the interior cavity, and an even number of additional walls connecting the first wall to the second and third walls,
a first aperture that extends from the front of the body to the first end of the interior cavity, and
a second aperture that extends from the rear of the body to the second end of the interior cavity, wherein the first and second apertures are in axial alignment along the longitudinal axis, wherein the housing is configured to retain the middle portion or the second end of the acoustic transducer within the second aperture to thereby retain the first end of the acoustic transducer within the interior cavity in axial alignment with the first aperture.

16. The grading system of claim 13, further including a computer system operatively coupled with the acoustic strength grading apparatus, wherein the computer system is programmed with computer-readable instructions that are operable, upon execution by one or more processors of the computer system, to
cause the inductor to strike an end of the workpiece at a first location along said end as the workpiece moves along a path of travel on a conveyor to thereby induce a first acoustic stress wave within the workpiece,
determine a velocity of the first acoustic stress wave within the workpiece based on data received from the detector;
cause the inductor to strike the end of the workpiece at a second location along said end as the workpiece moves along the path of travel on the conveyor to thereby induce a second acoustic stress wave within the workpiece;
determine a velocity of the second acoustic stress wave within the workpiece based on data received from the detector;
estimate a modulus of elasticity (MOE) of the workpiece based at least in part on the determined velocities.

17. The grading system of claim 16, further comprising a scanner configured to scan the workpiece, wherein the computer-readable instructions are operable, upon execution by the one or more processors, to estimate the MOE of the workpiece based at least in part on data received from the grading scanner.

18. The grading system of claim 16, further comprising a weight measuring system configured to detect a weight of the workpiece, wherein the computer-readable instructions are operable, upon execution by the one or more processors, to estimate the MOE of the workpiece based at least in part on data received from the weight measuring system.

19. The grading system of claim 18, further comprising a scanner configured to scan the workpiece, wherein the computer-readable instructions are operable, upon execution by the one or more processors, to estimate the MOE of the workpiece based at least in part on data received from the grading scanner.

* * * * *